US007552284B2

(12) United States Patent
Petev et al.

(10) Patent No.: US 7,552,284 B2
(45) Date of Patent: Jun. 23, 2009

(54) LEAST FREQUENTLY USED EVICTION IMPLEMENTATION

(75) Inventors: Petio G. Petev, Sofia (BG); Michael Wintergerst, Rauenberg (DE)

(73) Assignee: SAP AG, Walldorf (DE)

( * ) Notice: Subject to any disclaimer, the term of this patent is extended or adjusted under 35 U.S.C. 154(b) by 338 days.

(21) Appl. No.: 11/024,565

(22) Filed: Dec. 28, 2004

(65) Prior Publication Data

US 2006/0143393 A1 Jun. 29, 2006

(51) Int. Cl.
*G06F 12/00* (2006.01)

(52) U.S. Cl. .................. 711/130; 711/100; 711/135; 711/129; 718/1; 718/100

(58) Field of Classification Search .................. 711/118, 711/133, 143, 159, 132, 130
See application file for complete search history.

(56) References Cited

U.S. PATENT DOCUMENTS

| 5,566,315 | A | * | 10/1996 | Milillo et al. ............... 711/113 |
| 5,692,193 | A | | 11/1997 | Jagannathan et al. |
| 5,710,909 | A | | 1/1998 | Brown et al. |
| 5,926,834 | A | | 7/1999 | Carlson et al. |
| 5,944,781 | A | | 8/1999 | Murray |
| 6,038,571 | A | | 3/2000 | Numajiri et al. |
| 6,092,171 | A | | 7/2000 | Relph |
| 6,199,179 | B1 | | 3/2001 | Kauffman et al. |
| 6,216,212 | B1 | | 4/2001 | Challenger et al. |
| 6,256,712 | B1 | | 7/2001 | Challenger |
| 6,272,598 | B1 | | 8/2001 | Arlitt et al. |
| 6,295,582 | B1 | * | 9/2001 | Spencer ..................... 711/133 |
| 6,356,529 | B1 | | 3/2002 | Zarom |
| 6,356,946 | B1 | | 3/2002 | Clegg et al. |
| 6,412,045 | B1 | * | 6/2002 | DeKoning et al. .......... 711/135 |
| 6,438,654 | B1 | | 8/2002 | Elko et al. |
| 6,519,594 | B1 | | 2/2003 | Li |

(Continued)

FOREIGN PATENT DOCUMENTS

EP     1 380 941 A     5/2001

(Continued)

OTHER PUBLICATIONS

Stark, Ian; Longley, John, "CS2 Advanced Programming in Java note 9", 2002, pp. 1-5.*

(Continued)

*Primary Examiner*—Kevin L Ellis
*Assistant Examiner*—Kalpit Parikh
(74) *Attorney, Agent, or Firm*—Blakely, Sokoloff, Taylor & Zafman LLP

(57) ABSTRACT

Methods for a treatment of cached objects are described. In one embodiment, management of a region of a cache is configured with an eviction policy plug-in. The eviction policy plug-in includes an eviction timing component and a sorting component, with the eviction timing component including code to implement an eviction timing method, and the eviction timing method to trigger eviction of an object from the region of cache. The sorting component includes code to implement a sorting method to identify an object that is eligible for eviction from said region of cache. The sorting method includes identifying an object for eviction that is cached in the region of cache and that has been used less frequently than other objects that are cached in the region of cache.

15 Claims, 19 Drawing Sheets

U.S. PATENT DOCUMENTS

| | | | |
|---|---|---|---|
| 6,587,937 B1* | 7/2003 | Jensen et al. | 711/173 |
| 6,591,347 B2 | 7/2003 | Tischler et al. | |
| 6,651,080 B1 | 11/2003 | Liang et al. | |
| 6,738,977 B1 | 5/2004 | Berry et al. | |
| 6,754,662 B1 | 6/2004 | Li | |
| 6,766,419 B1 | 7/2004 | Zahir et al. | |
| 6,944,711 B2 | 9/2005 | Mogi et al. | |
| 6,976,090 B2 | 12/2005 | Ben-Shaul et al. | |
| 6,990,534 B2 | 1/2006 | Mikhailov et al. | |
| 6,996,679 B2 | 2/2006 | Cargnoni et al. | |
| 7,024,512 B1* | 4/2006 | Franaszek et al. | 711/100 |
| 7,051,161 B2 | 5/2006 | Dixit et al. | |
| 7,069,271 B1 | 6/2006 | Fadel et al. | |
| 7,191,170 B2 | 3/2007 | Ganguly et al. | |
| 7,296,267 B2 | 11/2007 | Cota-Robles et al. | |
| 2002/0046325 A1 | 4/2002 | Cai et al. | |
| 2002/0052914 A1 | 5/2002 | Zalewski et al. | |
| 2002/0073283 A1 | 6/2002 | Lewis et al. | |
| 2002/0093487 A1 | 7/2002 | Rosenberg | |
| 2002/0147888 A1* | 10/2002 | Trevathan | 711/133 |
| 2002/0169926 A1 | 11/2002 | Pinckney, III et al. | |
| 2003/0023827 A1 | 1/2003 | Palanca et al. | |
| 2003/0084248 A1* | 5/2003 | Gaither et al. | 711/133 |
| 2003/0084251 A1 | 5/2003 | Gaither et al. | |
| 2003/0093487 A1* | 5/2003 | Czajkowski et al. | 709/213 |
| 2003/0097360 A1 | 5/2003 | McGuire et al. | |
| 2003/0131010 A1 | 7/2003 | Redpath | |
| 2003/0229760 A1 | 12/2003 | Doyle et al. | |
| 2004/0024971 A1 | 2/2004 | Bogin et al. | |
| 2004/0054860 A1 | 3/2004 | Dixit et al. | |
| 2004/0088412 A1 | 5/2004 | John et al. | |
| 2004/0117441 A1 | 6/2004 | Liu et al. | |
| 2004/0168029 A1 | 8/2004 | Civlin | |
| 2004/0205299 A1 | 10/2004 | Bearden | |
| 2005/0021917 A1* | 1/2005 | Mathur et al. | 711/159 |
| 2005/0027943 A1 | 2/2005 | Steere et al. | |
| 2005/0071459 A1 | 3/2005 | Costa-Requena et al. | |
| 2005/0086656 A1 | 4/2005 | Whitlock et al. | |
| 2005/0086662 A1 | 4/2005 | Monnie et al. | |
| 2005/0125503 A1 | 6/2005 | Iyengar et al. | |
| 2005/0138193 A1 | 6/2005 | Encarnacion et al. | |
| 2005/0154837 A1 | 7/2005 | Keohane et al. | |
| 2005/0180429 A1 | 8/2005 | Ghahremani et al. | |
| 2005/0198199 A1 | 9/2005 | Dowling | |
| 2005/0262181 A1 | 11/2005 | Schmidt et al. | |
| 2005/0262493 A1 | 11/2005 | Schmidt et al. | |
| 2005/0262512 A1 | 11/2005 | Schmidt et al. | |
| 2006/0064545 A1 | 3/2006 | Wintergerst | |
| 2006/0064549 A1* | 3/2006 | Wintergerst | 711/134 |
| 2006/0070051 A1 | 3/2006 | Kuck et al. | |
| 2006/0092165 A1 | 5/2006 | Abdalla et al. | |
| 2006/0294253 A1 | 12/2006 | Linderman | |

FOREIGN PATENT DOCUMENTS

| | | |
|---|---|---|
| WO | WO/0023898 | 4/2000 |

OTHER PUBLICATIONS

Jagannathan et al. "High-Level Abstraction for Efficient Concurrent Systems", NEC Research Institute, Mar. 1994, Section 5.2.*

"Oracle Application Server 10g Release 2 (10.1.2)," Nov. 2004, Oracle.*

Dagfinn Parnas "SAP Virtual Machine Container", https://weblogs.sdn.sap.com/pub/wig/940 , Posted on Oct. 23, 2004, pp. 1-4.

Norbert Kuck, et al., "SAP VM Container: Using Process Attachable Virtual machines to Provide Isolation and Scalability For Large Servers", *Article*, SAP AG, Walldorf, Germany, 2002 pp. 1-2.

Renee Boucher Ferguson, "SAP Preps New NetWeaver Capabilities", eWeek.com, http://www.eweek.com/article2/0,1759,1668146.00.asp, Oct. 7, 2004, pp. 1-6.

SAP NetWever Makes Standard Java Robust http://www.sap.com/company/press/press.epx?pageview=print&pressid=3069 , Oct. 5, 2004, pp. 1-2.

"SAP Beefs Up Java Support Capabilities For New NetWeaver", News Story, Oct. 11, 2004, (Computerworld). http:www.computerworld.com/printthis/2004/0,4814,96558,00.html, pp. 1-2.

"SAP Presents New Capabilities For Netweaver", InfoWorld, Oct. 6, 2004 pp. 1-5, http://www.infoworld.com/article/04/10/06/HNsapnetweaver_1.html.

"Load Balancing of the SAP Web As for Java Applications", SAP Library, http://help.sap.com/saphelp_nw04/helpdata/en/b5/e8239ef7bd494f896a84625d4b688f/cont. 2 pages, Nov. 2004.

"Failover System", SAP Library, Nov. 2004, http://help.sap.com/saphelp_nw04/helpdata/en/d7/57af0cce55143be5de3a6e4911186.cont, 2 pages.

"Http Sessions and Failover of Web Application", SAP Libary, Nov. 2004, 1 page. http://help.sap.com/saphelp_nw04/helpdata/en/90/044cc585eaba42b649f16181b0fdf/cont.

WebLogic RMI Features and Guidelines, eDocs, pp. 1-7, Nov. 2004, http://e-docs.bea.com/wls/docs90/rmi/rmi_api.html.

"Java Technology in Sap Web Application Server", SAP Libary, http://help.sap.com/saphelp_nw04/helpdata/en/0d/a3bbeff62847ae10000000a114084/cont Nov. 2004, pp. 1-3.

"High Availability and Failover", SAP Library, http://help.sap.com/saphelp_nw04/helpdata/en/6c/209da105668c45be12f1d9cc412e2b/cont Nov. 2004, pp. 1-2.

"Failover for Enterprise Beans", SAP Libary, http://help.sap.com/saphelp_nw04/helpdata/en/8f/d6e45953a494499ea1b79ab16321d2/cont Nov. 2004, pp. 1-3.

"Failover for Clustered RMI-P4 Remote Objects", SAP Libary, http://help.sap.com/saphelp_nw04/helpdata/en/f6/4ef11ab3a52f408aa8a133f33d6cf1/cont Nov. 2004, pp. 1-3.

Grzegorz Czajkowski, "Multitasking without Compromise: a Virtual Machine Evolution", *Paper*, Sun Microsystems Laboratories, 2001, pp. 1-14.

Mick Jordan, et al. "Scaling J2EE Application Servers with the Multi-Tasking Virtual Machine", *Paper* , Sun Microsystems, SMLI TR-2004-135, Jun. 2004, pp. 1-19.

Mick Jordan, et al, "Extending a J2EE Server with Dynamic and Flexible Resource Management", *Paper*, Sun Microsystems, Inc, and School of Computer Science, University of Waterloo, Waterloo, ON, Canada, Oct. 2004, 20 pages.

Grzegorz Czajkowski, et al., "A Multi-User Virtual Machine", *Paper*, Sun Microsystems Laboratories and $S^3$ Lab, Purdue University, West Lafayette, IN, 2003, 14 pages.

Sudhir Movva & Murali Vallath, "Transparent Clustered Database Failover Using JAVA", http:www.quest-pipelines.com/newsletter-v5/0604_A.htm, Apr. 2004, 11 pages.

Ciaran Bryce; LogOn Technology Transfer, Kronerg, Germany, Experts' Corner: "Isolates: A New Approach to Multi-Programming in Java Platforms", May 2004, *Article*, 7 pages.

Patrick Tullmann, et al., "Janos: A Java-oriented OS for Active Network Nodes", *Paper*, Flux Research Group, University of Utah, Mar. 2001, 14 pages.

Patrick Doyle , et al., A Modular and Extensible JVM Infrastructure, *Paper*, Edward S. Rogers Sr. Department of Electrical and Computer Engineering, University of Toronto, Toronto, Ontario, Canada, 14 pages. Jul. 2002.

Sandhya Dwarkadas, et al., "Cashmere-VLM: Remote Memory Paging for Software Distributed Shared Memory", *Paper*, Compaq Cambridge Research Lab, Cambridge, MA and Department of Computer Science, University of Rochester, Rochester, NY, 7 pages, Apr. 1999.

Alex Gontmakher, et al. "Characterizations for Java Memory Behavior",*Paper*, Computer Science Department, Technion, 5 pages, 1997.

"System and Method for Shared Memory/File System Java ObjectGroup Clustered JVM", http://www.priorartdatabase.com/IPCOM/000021597/ , Published Jan. 2004, 3 pages.

Marcelo Loosco, et al., "A New Distributed Java Virtual Machine for Cluster Computing", Notes in Computer Science, Springer-Verlag, v. 2790, p. 1207-1215, 2003.

D. Dillenbeger, et al., "Building a Java Virtual Machine For Server Applications: The Jvm On Os/390", IBM Systems Journal, vol. 39, No. 1, 2000, pp. 194-210.

Robert Davies, "Data Caching: A Prerequisite to the Enterprise Service Bus", Business Integration Journal, Oct. 2003, pp. 41-44.
"Caching with IBM WebSphereMQ", spiritcache, Use Case & Code Example, article, Nov. 19, 2004, pp. 1-9.
"Using Rules-based Object Caching: Allocating dataresources for best service levels to profitable customers", spiritcache, White paper, Nov. 2004, pp. 1-8.
"Introducing Cache-Forward Architecture", ObjectStore, paper, Jan. 1, 2004, pp. 1-23.
Jerry Bortvedt, "Functional Specification for Object Caching Service for Java (OCS4J), 2.0", Paper, Aug. 9, 2000, pp. 1-27.
http://homepage.mac.com/vineetb/iblog/C684524823/, "Java VineetB-log.java", Dec. 18, 2003, 1 page.
http://db.apache.org/torque-32/managers-cache.html, "Managers—Intro", Apr. 11, 2002 pp. 1-4.
http://java-source.net/open-source/cache-solutions, "Open Source Cache Solutions in Java", Nov. 2004, pp. 1-3.
Thomas Conte, http://www.pas.net/tom/articles/oscache/en/, "Implementing OSCache", Jun. 2002, pp. 1-4.
Greg Luck, http://www.theserverside.com/news, "Ehcache 1.0 released", Oct. 9, 2004, pp. 1-5.
Srini Penchikala, http://www.onjava.com/pub/a/onjava/2003/caching.html, "Object Caching in a Web Portal Application Using JCS", Dec. 23, 2003, pp. 1-18.
http://jakarta.apache.org/jcs/Plugins.html, "JCS Plugin Overview", Jul. 2004, 2 pages.
http://www.mail-archive.com/turbine-jcs-dev@jakarta.apache.org/msq00647.html, turbine-jcs-dev, Jul. 13, 2004, pp. 1-3.
Srini Penchikala, http://www.javaworld.com/javaworld/jw-05-2004/jw-0531-cache_p.html, J2EE Object-Caching Frameworks, May 31, 2004.
http://.jcp.org/en/jsr/detail?id=107, JSR 107: JCACHE-Java Temporary Caching API, Mar. 20, 2001, 5 pages.
http://www.opensymphony.com/oscache, "OSCache", Nov. 2004, 1 page.
Andres March, http://www.opensymphony.com/oscache/wiki/Change%20Log.html, OsCache: Change Log, Jan. 18, 2004, pp. 1-11.
http://www.jdocs.com/osche/2.0.2/api/com/opensymphony/oscache/base/AbstractCache.html, "Class AbstractCacheAdministrator" Jan. 2004, pp. 1-11.
http://www.jdocs.com/osche/2.0.2/api/com/opensymphony/oscache/base/Cache.html, "Class Cache" Jan. 2004, pp. 1-16.
http://www.jdocs.com/osche/2.0.2/api/com/opensymphony/oscache/base/CacheEntry.html, "Class CacheEntry" Jan. 2004, pp. 1-8.
http://www.jdocs.com/osche/2.0.2/api/com/opensymphony/oscache/base/Config.html, "Class Config" Jan. 2004, pp. 1-4.
http://www.jdocs.com/osche/2.0.2/api/com/opensymphony/oscache/base/overview-sum.html, "OSCache, V 2.0.2 API Specification" Jan. 2004, 2 pages.
http://www.jdocs.com/osche/2.0.2/api/com/opensymphony/oscache/base/overview-frame.html, "OSCache 2.0.2" Jan. 2004, 1 page.
http://www.jdocs.com/osche/2.0.2/api/com/opensymphony/oscache/base/allclases-frame.html, "All Classes" Jan. 2004, 1 page.
http://www.spirit-soft.com/index.do?id=30, "spiritcache", Nov. 2004, 1 pages.
Floyd Marinescu, http://www.theserverside.com/news/thread.tss?thread_id=18483, "SpiritSoft Announces Availability of SpiritCache 2.0", Mar. 21, 2003, pp. 1-5.
Stark 2002/Langley 2004, Concurrent Programming In Java, CS2 Advanced programming in Java note 9, S2Bh, Jan. 3, 2002 pp. 1-5.
Thomas Smits Unbreakable Java, The Java Server that Never Goes Down, Nov. 2004, pp. 1-5.
JSR 107: JCACHE—Java Temporary Caching API, Website, http://web1.jcp.org/en/jsr/detail?id=107, Nov. 28, 2004.
Salo, T., et al., "Persistence in Enterprise JavaBeans Applications," pp. 3 (double-sided), JOOP, Jul. 1999, XP-002142904.
Salo, T., et al., "Object Persistence Beyond Serialization", Increasing productivity and reducing maintenance, Dr. Dobb's Journal, M7T Publ., vol. 24, No. 5, May 1999, pp. 5 (double-sided), XP-000925486. ISSN: 1044-789X.
Srinivasan, V., et al., "Object Persistence In Object-Oriented Applications," IBMSystems Journal, IBM Corp., vol. 36, No. 1, 1997, pp. 11 (double-sided),XP000685709, ISSN: 0018-8670.
Michael Wintergerst, "Storage Plug-In Based on Shared Closures", U.S. Appl. No. 11/024,613, filed Dec. 28, 2004, Office Action mailed Feb. 6, 2007. The Office Action, claims as they stood in the application prior to the mailing of the Office Action and the claims as they were presented to the PTO in response to the Office Action.
Petio G. Petev, "Common Cache Management in a Plurality of Virtual Machines", U.S. Appl. No. 11/025,482, filed Dec. 28, 2004, Office Action mailed Feb. 27, 2007. Office Action, claims as they stood in the application prior to the mailing of the Office Action and a copy of the claims as they were presented to the PTO in response to the Office Action.
Galin Galchev, "Plug-In Based Caching Architecture Capable of Implementing Multiple Cache Regions Per Application", U.S. Appl. No. 11/024,554, filed Dec. 28, 2004, Office Action mailed Apr. 26, 2007. Office Action, claims as they stood in the application prior to the mailing of the Office Action and the claims as they were presented to the PTO in response to the Office Action.
Barrett, Ryan, Barrett, Ryan, *P4 Protocol Specification*, Sep. 2001, p. 1-12.
Handy, Jim, "The Cache Memory Book", *1998, Academic Press Inc*, 2nd Edition, pp. 60, vii—229.
Hennessy, John, et al., "Computer Organization and Design", *1998, Morgan Kaufmann Publishers Inc.*, 2nd Edition, pp. 575-576.
No Author Name Supplied In, Source Data, "Shared disk I/O cache", "*Shared disk I/O cache:*" ip.com Journal, Ip.com Inc., West Henrietta, Jan. 29, 2004, XP013014199 ISSN: 1533-0001, pp. 6., (Jan. 24, 2004), 6.
Veldema, R., "Runtime Optimizations for a Java DSM Implementation" JAVA Grande/ISCOPE, ACM 2001, pp. 153-162.
Office Action from U.S. Appl. No. 11/024,524, mailed Oct. 22, 2007, 18 pgs.
Office Action from U.S. Appl. No. 11/024,651, mailed Oct. 9, 2007, 21 pgs.
Office Action from U.S. Appl. No. 11/024,554, mailed Oct. 29, 2007, 11 pgs.
Office Action from U.S. Appl. No. 11/025,178, mailed Aug. 10, 2007, 10 pgs.
Office Action from U.S. Appl. No. 11/024,546, mailed Oct. 3, 2007, 18 pgs.
Office Action from U.S. Appl. No. 11/024,614, mailed Aug. 27, 2007, 9 pgs.
Galchev, Galin, "Cache Region Concept", Office Action from U.S. Appl. No. 11/024,554, mailed May 28, 2008.
Pawlan, Monica, "Reference Objects and Garbage Collection", *Sun Microsystems.*, (Aug. 1998), 8, 15 and 16.
Petev, Petio, "First In First Out Eviction Implementation", Office Action from U.S. Appl. No. 11/024,546, mailed Mar. 17, 2008.
Petev, Petio, "Size Based Eviction Implementation", Notice of Allowance from U.S. Appl. No. 11/024,591, mailed Aug. 21, 2008.
Petio, Peter, "Programming Models For Storage Plug-Ins", Notice of Allowance from U.S. Appl. No. 11/024,651, mailed Jul. 28, 2008.
Wintergerst, Michael, "Programming Models For Eviction Policies", Notice of Allowance from U.S. Appl. No. 11/025,178, mailed Jun. 9, 2008.

* cited by examiner

LEAST FREQUENTLY USED EVICTION IMPLEMENTATION

TECHNICAL FIELD

Embodiments of the present invention relate to memory management, and in one embodiment, a method to minimize memory footprint of different software entities and maximize performance using already constructed objects.

BACKGROUND

FIG. 1 shows a prior art computing system 100 having N virtual machines 113, 213, . . . N13. The prior art computing system 100 can be viewed as an application server that runs web applications and/or business logic applications for an enterprise (e.g., a corporation, partnership or government agency) to assist the enterprise in performing specific operations in an automated fashion (e.g., automated billing, automated sales, etc.).

The prior art computing system 100 runs are extensive amount of concurrent application threads per virtual machine. Specifically, there are X concurrent application threads ($112_1$ through $112_X$) running on virtual machine 113; there are Y concurrent application threads ($212_1$ through $212_Y$) running on virtual machine 213; . . . and, there are Z concurrent application threads ($N12_1$ through $N12_Z$) running on virtual machine N13; where, each of X, Y and Z are a large number.

A virtual machine, as is well understood in the art, is an abstract machine that converts (or "interprets") abstract code into code that is understandable to a particular type of a hardware platform. For example, if the processing core of computing system 100 included PowerPC microprocessors, each of virtual machines 113, 213 through N13 would respectively convert the abstract code of threads $112_1$ through $112_X$, $212_1$ through $212_Y$, and $N12_1$ through $N12_Z$ into instructions sequences that a PowerPC microprocessor can execute.

Because virtual machines operate at the instruction level they tend to have processor-like characteristics, and, therefore, can be viewed as having their own associated memory. The memory used by a functioning virtual machine is typically modeled as being local (or "private") to the virtual machine. Hence, FIG. 1 shows local memory 115, 215, N15 allocated for each of virtual machines 113, 213, . . . N13 respectively.

A portion of a virtual machine's local memory may be implemented as the virtual machine's cache. As such, FIG. 1 shows respective regions 116, 216, . . . N16 of each virtual machine's local memory space 115, 215, . . . N15 being allocated as local cache for the corresponding virtual machine 113, 213, . . . N13. A cache is a region where frequently used items are kept in order to enhance operational efficiency. Traditionally, the access time associated with fetching/writing an item to/from a cache is less than the access time associated with other place(s) where the item can be kept (such as a disk file or external database (not shown in FIG. 1)).

For example, in an object-oriented environment, an object that is subjected to frequent use by a virtual machine (for whatever reason) may be stored in the virtual machine's cache. The combination of the cache's low latency and the frequent use of the particular object by the virtual machine corresponds to a disproportionate share of the virtual machine's fetches being that of the lower latency cache; which, in turn, effectively improves the overall productivity of the virtual machine.

A problem with the prior art implementation of FIG. 1, is that, a virtual machine can be under the load of a large number of concurrent application threads; and, furthermore, the "crash" of a virtual machine is not an uncommon event. If a virtual machine crashes, generally, all of the concurrent application threads that the virtual machine is actively processing will crash. Thus, if any one of virtual machines 113, 213, N13 were to crash, X, Y or Z application threads would crash along with the crashed virtual machine. With X, Y and Z each being a large number, a large number of applications would crash as a result of the virtual machine crash.

Given that the application threads running on an application server 100 typically have "mission critical" importance, the wholesale crash of scores of such threads is a significant problem for the enterprise.

SUMMARY

Methods for a treatment of cached objects are described. In one embodiment, management of a region of a cache is configured with an eviction policy plug-in. The eviction policy plug-in includes an eviction timing component and a sorting component, with the eviction timing component including code to implement an eviction timing method, and the eviction timing method to trigger eviction of an object from the region of cache. The sorting component includes code to implement a sorting method to identify an object that is eligible for eviction from said region of cache. The sorting method includes identifying an object for eviction that is cached in the region of cache and that has been used less frequently than other objects that are cached in the region of cache.

BRIEF DESCRIPTION OF THE DRAWINGS

The present invention is illustrated by way of example, and not limitation, in the figures of the accompanying drawings in which:

FIG. 9 illustrates one embodiment of different programming models for a storage plug-in.
FIG. 13a illustrates an embodiment of an eviction policy plug-in.
FIG. 13b illustrates a detailed perspective of various types of queues that may be implemented by the Sorting component of an eviction policy plug-in.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product that may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPOMs, magnetic or optical cards, flash memory, or other type of media/machine-readable medium suitable for storing electronic instructions.

Shared Memory and Shared Closures

Figure 1:
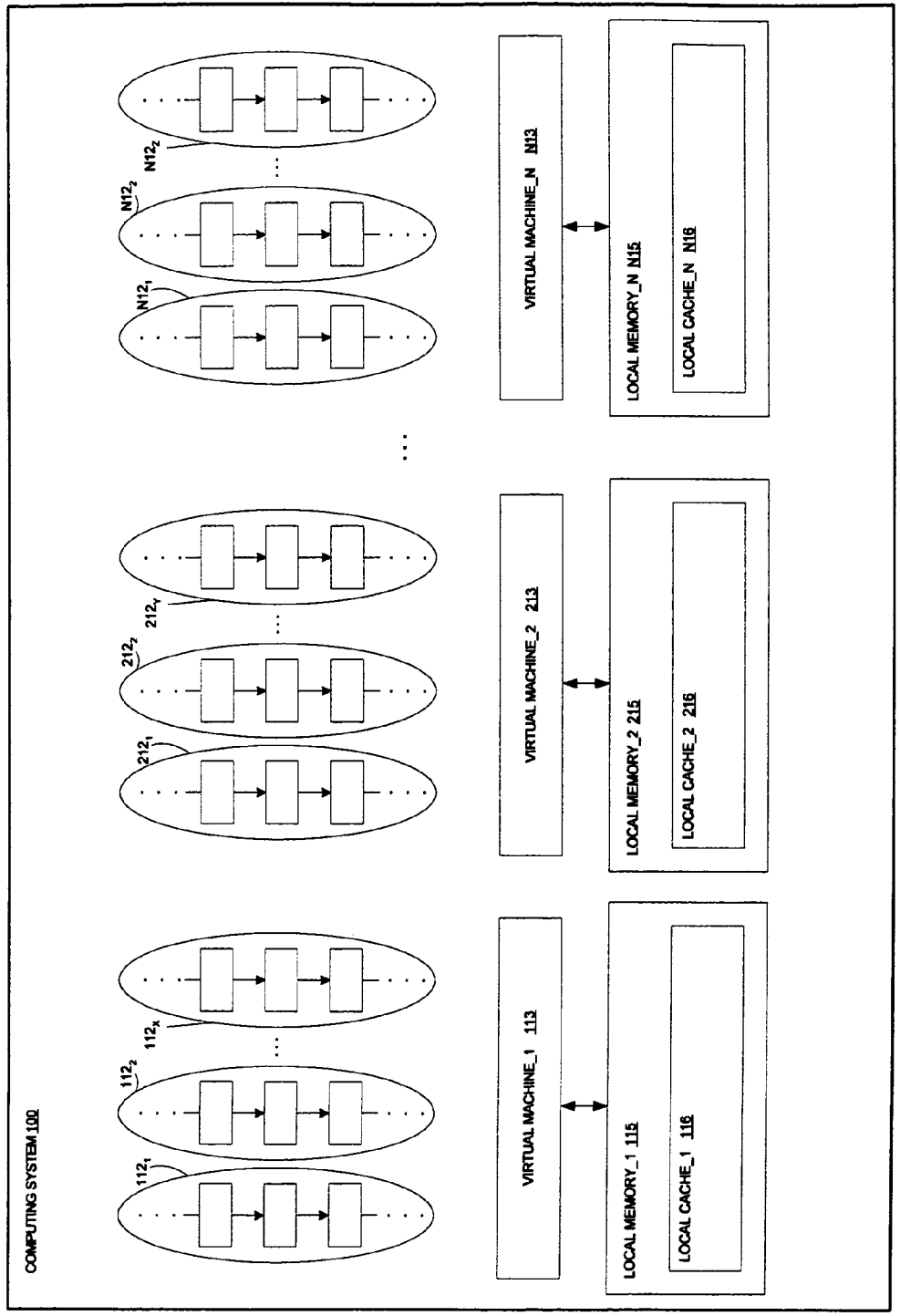
FIG. 1 shows a portion of a prior art computing system.
Figure 2:
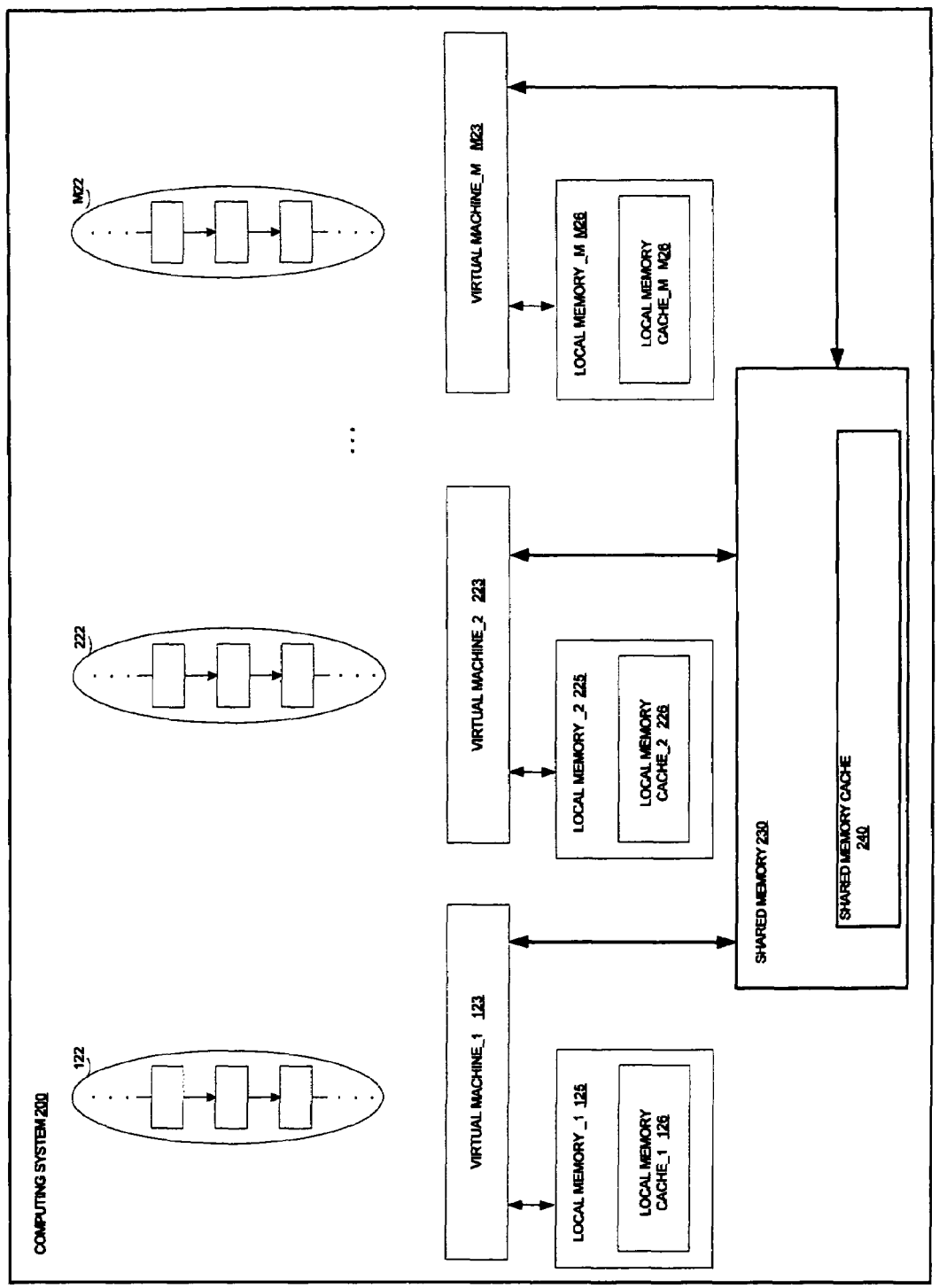
FIG. 2 shows a portion of an improved computing system.

FIG. 2 shows a computing system 200 that is configured with less application threads per virtual machine than the prior art system of FIG. 1. Less application threads per virtual machine results in less application thread crashes per virtual machine crash; which, in turn, should result in the new system 200 of FIG. 2 exhibiting better reliability than the prior art system 100 of FIG. 1.

According to the depiction of FIG. 2, which is an extreme representation of the improved approach, only one application thread exists per virtual machine (specifically, thread 122 is being executed by virtual machine 123; thread 222 is being executed by virtual machine 223, . . . and, thread M22 is being executed by virtual machine M23). In practice, the computing system 200 of FIG. 2 may permit a limited number of threads to be concurrently processed by a single virtual machine rather than only one.

In order to concurrently execute a comparable number of application threads as the prior art system 100 of FIG. 1, the improved system 200 of FIG. 2 instantiates more virtual machines than the prior art system 100 of FIG. 1. That is, M>N.

Thus, for example, if the prior art system 100 of FIG. 1 has 10 application threads per virtual machine and 4 virtual machines (e.g., one virtual machine per CPU in a computing system having four CPUs) for a total of 4×10=40 concurrently executed application threads for the system 100 as a whole, the improved system 200 of FIG. 2 may only permit a maximum of 5 concurrent application threads per virtual machine and 6 virtual machines (e.g., 1.5 virtual machines per CPU in a four CPU system) to implement a comparable number (5×6=30) of concurrently executed threads as the prior art system 100 in FIG. 1.

Here, the prior art system 100 instantiates one virtual machine per CPU while the improved system 200 of FIG. 2 can instantiate multiple virtual machines per CPU. For example, in order to achieve 1.5 virtual machines per CPU, a first CPU will be configured to run a single virtual machine while a second CPU in the same system will be configured to run a pair of virtual machines. By repeating this pattern for every pair of CPUs, such CPU pairs will instantiate 3 virtual machines per CPU pair (which corresponds to 1.5 virtual machines per CPU).

Recall from the discussion of FIG. 1 that a virtual machine can be associated with its own local memory. Because the improved computing system of FIG. 2 instantiates more virtual machines that the prior art computing system of FIG. 1, in order to conserve memory resources, the virtual machines 123, 223, . . . M23 of the system 200 of FIG. 2 are configured with less local memory space 125, 225, . . . M25 than the local memory space 115, 215, . . . N15 of virtual machines 113, 213, . . . N13 of FIG. 1. Moreover, the virtual machines 123, 223, . . . M23 of the system 200 of FIG. 2 are configured to use a shared memory 230. Shared memory 230 is memory space that contains items that can be accessed by more than one virtual machine (and, typically, any virtual machine configured to execute "like" application threads that is coupled to the shared memory 230).

Thus, whereas the prior art computing system 100 of FIG. 1 uses fewer virtual machines with larger local memory resources containing objects that are "private" to the virtual machine; the computing system 200 of FIG. 2, by contrast, uses more virtual machines with less local memory resources. The less local memory resources allocated per virtual machine is compensated for by allowing each virtual machine to access additional memory resources. However, owing to limits in the amount of available memory space, this additional memory space 230 is made "shareable" amongst the virtual machines 123, 223, . . . M23.

According to an object oriented approach where each of virtual machines 123, 223, . . . M23 does not have visibility into the local memories of the other virtual machines, specific rules are applied that mandate whether or not information is permitted to be stored in shared memory 230. Specifically, to first order, according to an embodiment, an object residing in shared memory 230 should not contain a reference to an object located in a virtual machine's local memory because an object with a reference to an unreachable object is generally deemed "non useable".

That is, if an object in shared memory 230 were to have a reference into the local memory of a particular virtual machine, the object is essentially non useable to all other virtual machines; and, if shared memory 230 were to contain an object that was useable to only a single virtual machine, the purpose of the shared memory 230 would essentially be defeated.

In order to uphold the above rule, and in light of the fact that objects frequently contain references to other objects (e.g., to effect a large process by stringing together the processes of individual objects; and/or, to effect relational data structures), "shareable closures" are employed. A "closure" is a group of one or more objects where every reference stemming from an object in the group that references another object does not reference an object outside the group. That is, all the object-to-object references of the group can be viewed as closing upon and/or staying within the confines of the group itself. Note that a single object without any references stemming from can be viewed as meeting the definition of a closure.

If a closure with a non shareable object were to be stored in shared memory 230, the closure itself would not be shareable with other virtual machines, which, again, defeats the purpose of the shared memory 230. Thus, in an implementation, in order to keep only shareable objects in shared memory 230 and to prevent a reference from an object in shared memory 230 to an object in a local memory, only "shareable" (or "shared") closures are stored in shared memory 230. A "shared closure" is a closure in which each of the closure's objects are "shareable."

A shareable object is an object that can be used by other virtual machines that store and retrieve objects from the shared memory 230. As discussed above, in an embodiment, one aspect of a shareable object is that it does not possess a reference to another object that is located in a virtual machine's local memory. Other conditions that an object must meet in order to be deemed shareable may also be effected. For example, according to a particular Java embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; 5) it is an instance of a class that does not interfere with proper operation of a garbage collection algorithm; 6) it has no transient fields; and, 7) its finalize ( ) method is not overwritten.

Exceptions to the above criteria are possible if a copy operation used to copy a closure into shared memory 230 (or from shared memory 230 into a local memory) can be shown to be semantically equivalent to serialization and deserialization of the objects in the closure. Examples include instances of the Java 2 Platform, Standard Edition 1.3 java.lang.String class and java.util.Hashtable class.

Cache Management Across Local and Shared Memory Resources

Figure 3:
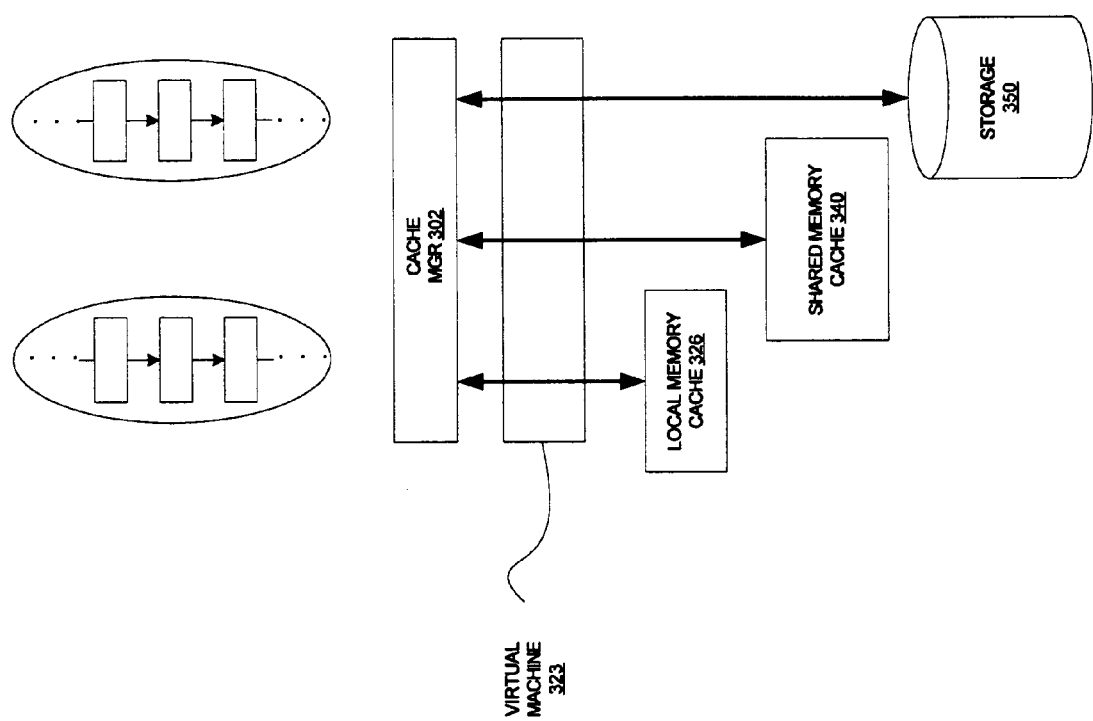
FIG. 3 shows a cache management service.

Note that the introduction of the shared memory 230 introduces the prospect of a shared cache 240. Thus, the architecture of FIG. 2 includes both local memory level caches 126, 226, . . . M26 and a shared memory cache 240. FIG. 3 shows a depiction of a cache management service 302 that can, for example, be added to the suite of services offered by a container 301 that an application thread runs in. A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

FIG. 3 shows that more than one thread can be actively processed by the virtual machine 323 depicted therein. It should be understood that, in accordance with the discussion concerning FIG. 2, the number of threads that the virtual machine 323 can concurrently entertain should be limited (e.g., to some fixed number) to reduce the exposure to a virtual machine crash. For example, according to one implementation, the default number of concurrently executed threads is 5. In a further implementation, the number of concurrently executed threads is a configurable parameter so that, conceivably, for example, in a first system deployment there are 10 concurrent threads per virtual machine, in a second system deployment there are 5 concurrent threads per virtual machine, in a third system deployment there is 1 concurrent thread per virtual machine. It is expected that a number of practical system deployments would choose less than 10 concurrent threads per virtual machine.

The cache management service 302 is configured to have visibility into the local memory cache 325 of the virtual machine 323, the shared memory cache 340 and one or more other storage resources 350 such as a database or file system used for storing persisted objects. Here, as will be described in more detail below, different applications whose abstract code (e.g., Java byte code in the case of Java) is executed by virtual machine 323 can specially configure the cache management service 302 to treat its cached objects in accordance with specific guidelines.

According to various schemes, the cache manager 302 effectively configures regions of cache for the storage of objects in local cache memory 326 and/or in shared memory cache 340 according to different treatment policies. Multiple cache regions defining different cache treatments may be established for a single application. Cached objects placed in local memory cache 326 may be conveniently utilized by the virtual machine 323 associated with the local memory where local cache 326 resides for quick processing by the application. By contrast, cached objects placed in shared memory cache 340 may be utilized by the local virtual machine 323 as well as other virtual machines that have visibility into the shared memory in which the shared memory cache 340 is implemented.

Figure 4:
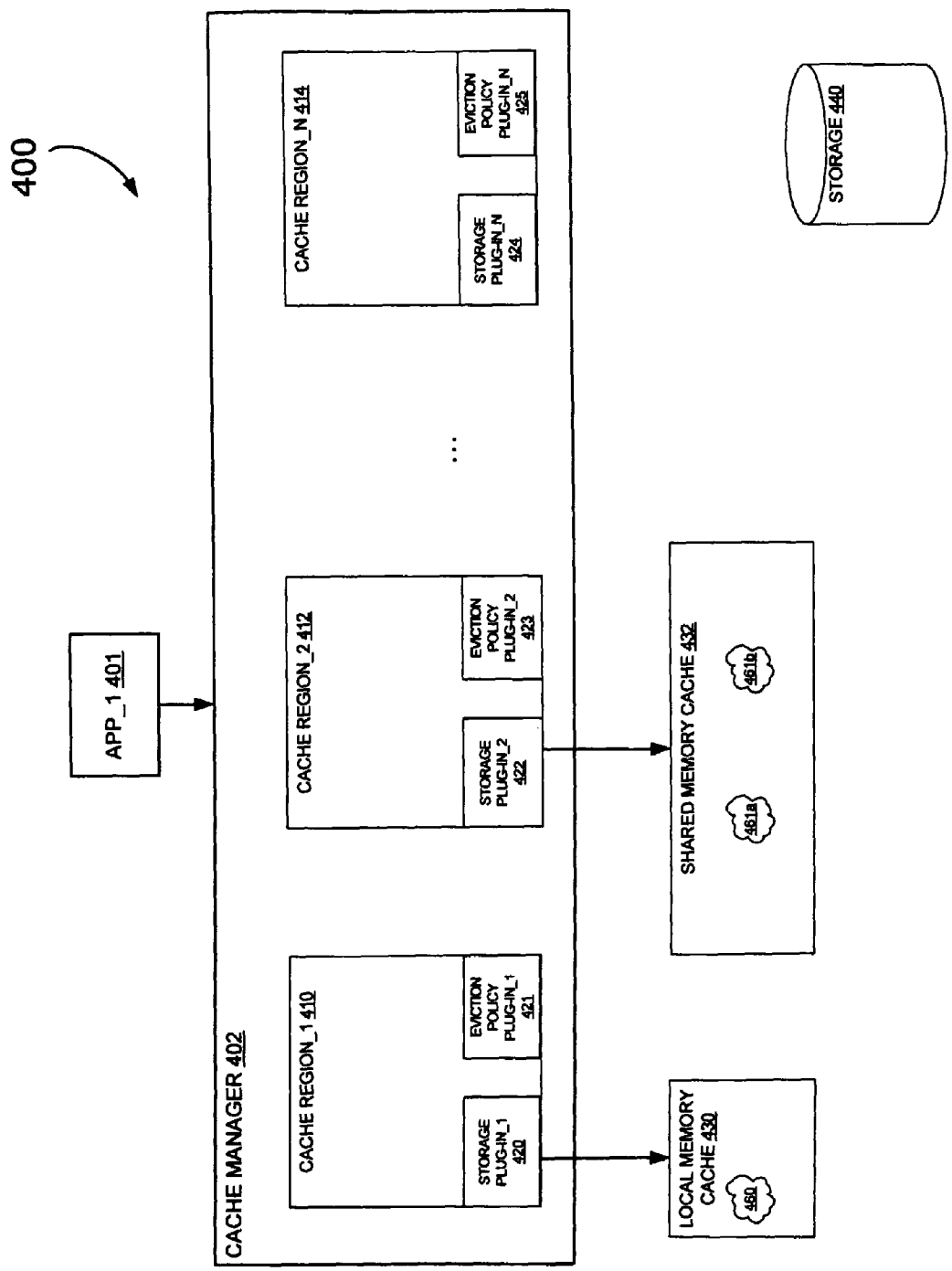
FIG. 4 illustrates one embodiment of a cache implementation with respect to local memory and shared memory.

FIG. 4 illustrates a more detailed perspective of an embodiment of the cache manager 302 of FIG. 3. Specifically, FIG. 4 illustrates the formation of multiple cache regions (cache region_1 410, cache region_2 412, . . . cache region_N 414) that are controlled by cache manager 402. In one embodiment, a plurality of cache regions may be controlled by cache manager 402 for a single application. The cache regions may, for example, be formed by commands executed by an application (e.g., app_1 401) calling for the establishment of the cache regions themselves.

A cache region effectively determines the treatment that an object that is stored in the cache region will receive. For example, cache region_1 410 determines the treatment of object 460, while cache region_2 412 determines the treatment of cached object 461. By comparison, object 460 will receive different treatment than object 461 because of the different treatment imposed by the different cache regions 410, 412.

For each cache region, in an embodiment, cache manager 402 implements a storage plug-in and an eviction policy plug-in. The storage plug-in may be, in one embodiment, the actual piece of software or code that executes the "get" and "put" operations for the objects stored according to the treatment determined by the associated cache region. That is, for example, whether the object is placed in the local memory cache, the shared memory cache, or some other type of storage resource such as a database or file system for storing persisted objects. The eviction policy plug-in may be, in one embodiment, the actual piece of software or code that dictates the removal of an object from cache (e.g., when some form of cache capacity threshold is exceeded).

In continuing from the example provided above, cache region_1 410 defines the treatment of object 460 with storage plug-in_1 420 and eviction policy plug-in_1 421. Cache region_2 412 defines the treatment of object 461 with storage plug-in_2 422 and eviction policy plug-in_2 423. Cache region_N 414 is generally represented as having storage plug-in_N 424 and eviction policy plug-in_N 425. For simplicity of description, each cache region is described as having only a single object that is treating according to the treatment determined by the cache region, but, it should be appreciated that any number of objects may be referenced by a particular cache region. Moreover, any object stored in, copied from, written to, or removed from the shared memory cache 432 may be a single object; or, an object that is part of a shared closure where the shared closure itself is respectively stored in, copied from, written to, or removed from the shared memory cache 432.

As illustrated in FIG. 4, a storage policy plug-in of a cache region may dictate that an object stored in the local and/or shared cache memory be copied into a persisted storage space 440 (e.g., as part of the object's removal from the cache). One type of eviction process, referred to as "spooling," initiates persistence of the object upon the object's eviction from cache. As such, the evicted object is written into deeper storage space such as a hard disk file or a remote database 440. Another or related storage policy plug-in function may be used to perform a "write-through" process, in which a "put" of an object into cache automatically results in a copy of that object being directed to storage space 440.

Until now, a cache region (e.g., cache region_1 410) has been generally described as defining the treatment for a particular object, that is, for putting and/or getting an object to/from either the local memory cache and/or the shared memory cache. The following provides greater detail as to the different types of cache regions that may be implemented by cache manager 402 for the treatment of objects as defined by its storage and eviction policy plug-ins. The different types of cache management treatments are referred to as "flavors" or "cache flavors".

Cache Management Flavors

Figure 5:
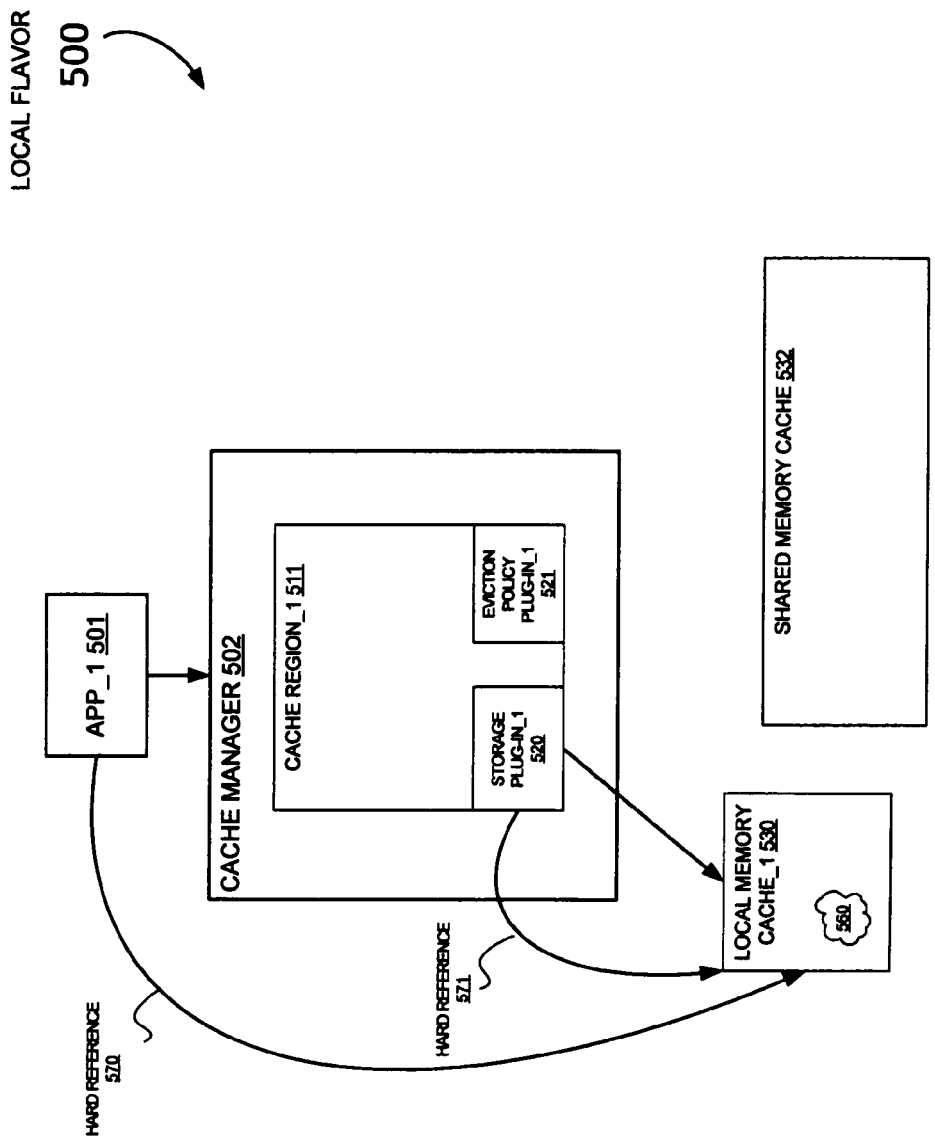
FIG. 5 illustrates an embodiment of a first cache region flavor.

FIG. 5 illustrates an embodiment of the first cache region flavor 500, referred to as "Local", which has object treatment behavior defined by cache region_1 511. Cache region_1 511 managed by cache manager 502 includes a "local" flavor storage plug-in_1 520 and eviction policy plug-in_1 521 that together implement the treatment of objects that are cached within the first cache region. The local flavor is useable with non-shareable objects that have no potential for storage into shared memory. The essence of the local flavor is that an object 560 is kept in local memory cache 530 and not shared memory cache 532; and, that hard reference(s) 570, 571 are made to the object 560 so that the object 560 cannot be removed from the local memory cache 530 by a "garbage collector." A garbage collector, which is a well known process, removes objects from local memory cache 530 (depending on the local memory usage and the type of references being made to the objects). Note that the garbage collector is a background process that is different than the eviction policy processes instituted by the eviction policy plug-in 521.

As shown in FIG. 5, according to the "local" flavor, a first "hard" reference 570 is made by application_1 501 to object 560 (at least while the object 560 is actively being used by the application 501), and a second "hard" reference 571 is made to the object 560 by storage plug-in_1 520. A particular type of reference to an object represents, in one embodiment, a relative difficulty level in removing an object from the memory cache. A "hard" (or "strongly reachable") referenced object remains in the memory (i.e., the object is not removed from local memory 530 by the garbage collector). A "soft" referenced object remains in the memory until there is a danger of OutofMemoryError (e.g., threshold level is exceeded in terms of available local memory space) or some other algorithm (typically based on memory usage) used by the garbage collector. A "weak" referenced object is removed by the garbage collector regardless of the local memory's available space. A java VM implementation is allowed however, to treat soft references like weak references (i.e., softly referred to objects are removed by the garbage collector irrespective of memory usage).

Active removal of an object by the eviction policy plug-in (i.e., eviction) ignores the referenced states of the object as described above. As such, hard referenced objects may be just as easily removed as weak referenced objects according to the policies set forth by the eviction policy plug-in 521. Here, note that storage plug-in 520 may also institute "spooling" and "write through" policies to deeper storage. In an embodiment, a separate plug-in in cache region 511 (not shown) is used to interface with the deeper storage and is called upon as needed by storage plug-in 520 to institute spooling and write through policies.

Figure 6:
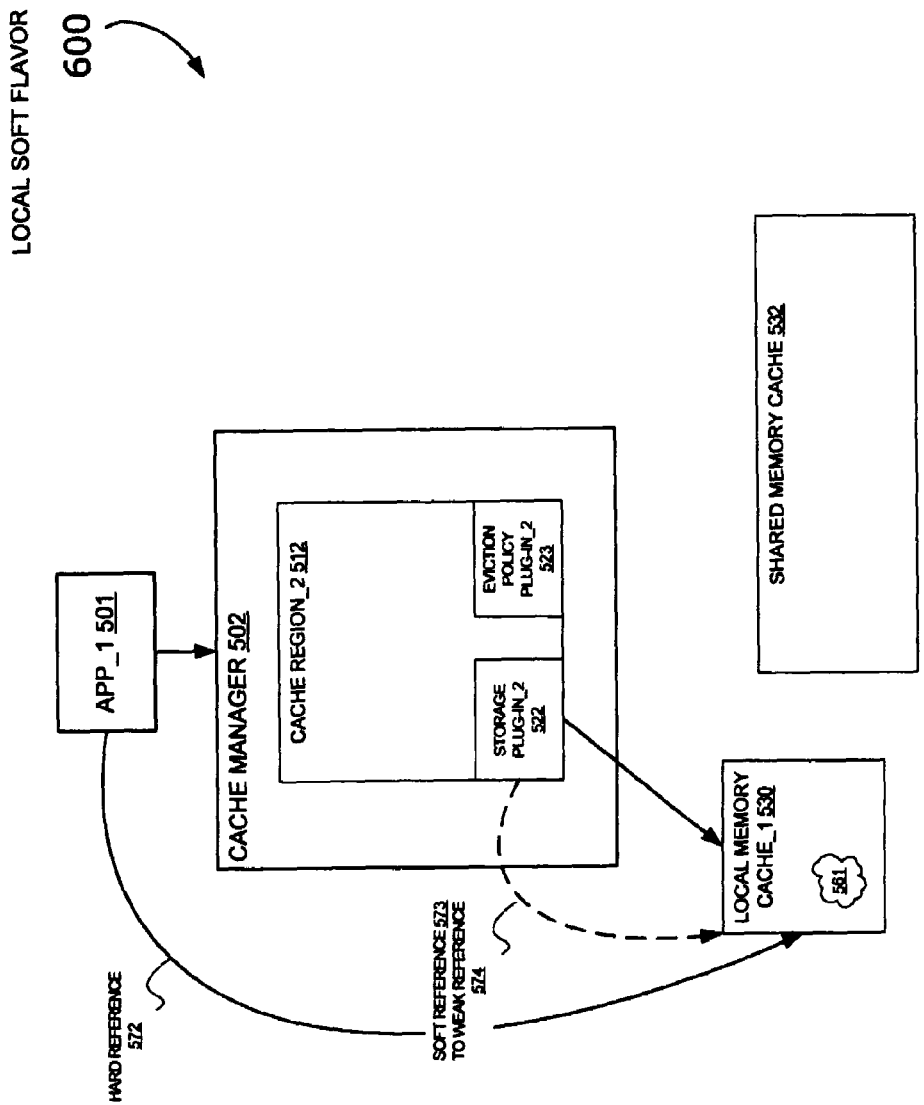
FIG. 6 illustrates an embodiment of a second cache region flavor.

FIG. 6 illustrates an embodiment of a second cache region flavor 600 referred to as "Local Soft." The Local Soft flavor is similar to the Local flavor of FIG. 5 but is different with respect to the references made to the object 561 by the storage plug-in 522. In particular, storage plug-in_2 522 does not maintain a hard reference to object 561 in local memory cache_1 530. Instead, a soft reference 573 is established. With a soft reference, according to one embodiment, object 561 remains in local memory cache_1 530 until the eviction policy plug-in raises some type of memory availability concern, at which time an active eviction process is invoked by eviction policy plug-in_2 523.

When the active eviction process is invoked, soft reference 573 is changed to a weak reference 574. Under this condition, object 561 may be removed by a garbage collector if the application's hard reference no longer exists (e.g., because the application is no longer actively using the object 561). That is, object 561 remains protected from removal by the garbage collector as long as the application's hard reference 572 to the object 561 is present, otherwise the object will be removed. Here, note that storage plug-in 522 may also institute "spooling" and "write through" policies to deeper storage. In an embodiment, a separate plug-in in cache region 512 (not shown) is used to interface with the deeper storage and is called upon as needed by storage plug-in 522 to institute spooling and write through policies. In one embodiment, by invoking the removal of object 560 from local memory cache_1 530 (either by active eviction or garbage collection), cache region_2 512 may also provide for object 560 to be copied to deeper storage.

Before moving forward it is important to re-emphasize that objects stored according to either of the local flavors discussed above may be of the non shareable type so as to be incapable of membership in a shared closure and storage into shared memory. Moreover, the application is apt to configure its different local cache regions such that objects receiving local flavor treatment are apt to be more heavily used (i.e., some combination of the number of "get" and "put" accesses over time) than objects treated according to the Soft Local flavor.

Figure 7:
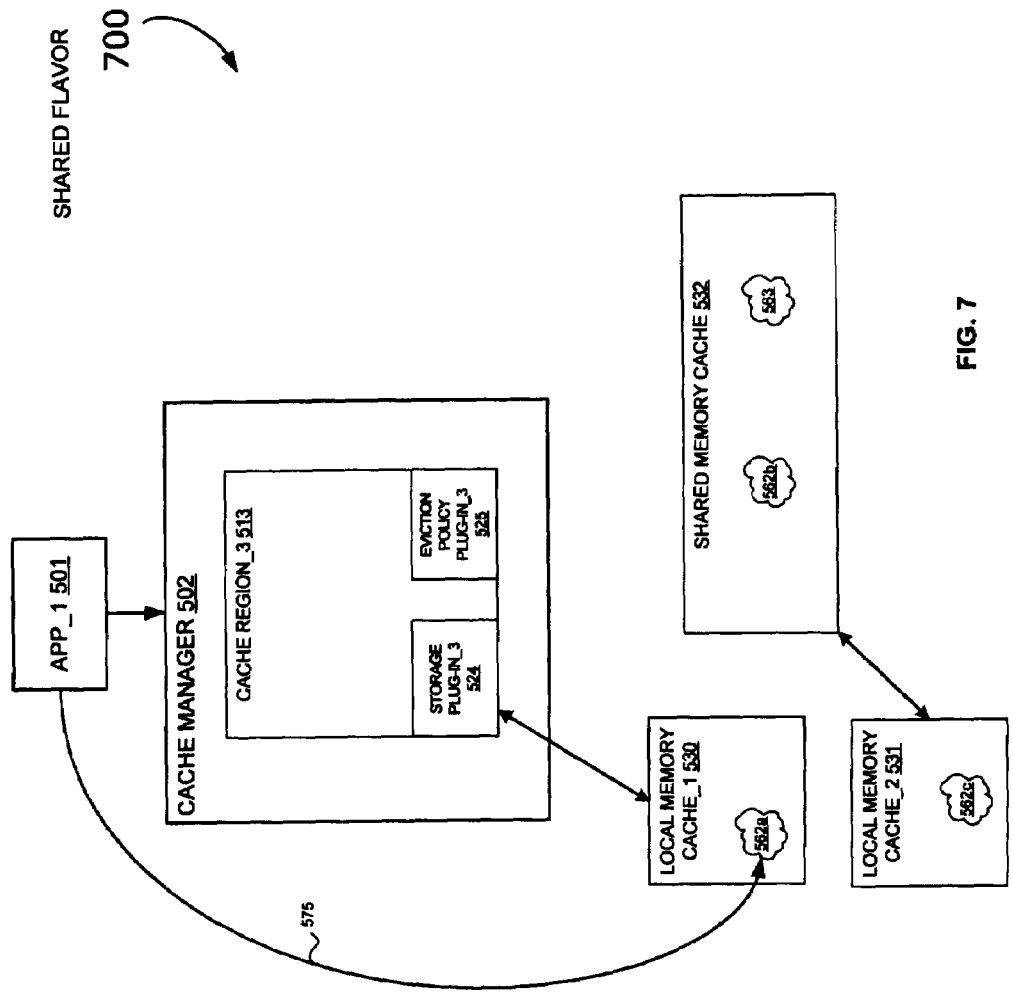
FIG. 7 illustrates an embodiment of a third cache region flavor.

FIG. 7 illustrates an embodiment of a third flavor 700 referred to as "Shared." The "Shared" flavor is different from both the Local flavors in that an object representation resides in shared memory cache 532 as part of a shared closure. Under the "shared" flavor, when an application 501 causes an object 562a to be first "put" into local memory cache, the storage plug-in 524 also puts a copy 562b of the object 562a into the shared memory cache 520. The application 501 places a hard reference 575 to the local copy 561a.

The application 501 is then free to use the local copy 562a as a "work horse" object. For each "put" operation made to the local copy 562a, (e.g., to effectively modify the object's earlier content) the storage plug-in 524 updates/writes to the shared copy 562b to reflect the "put" into the local memory cache 530. Note that because of the presence of shared copy 562b, a virtual machine other than the virtual machine that is associated with the local memory within which local memory cache_1 530 is implemented may copy the shared copy 562b into its local memory cache (e.g., local memory cache 531) so as to create a third copy 562c of the object. The third copy 562c of the object can be used as a "work horse" object for another application (not shown) that runs off of the other local memory cache 531. This other application will make a hard reference to this object 562c as well (not shown). In one embodiment, storage plug-in 524 does not place any kind of reference to shared copy 562b because any shared closure is reachable in shared memory through a key name that uniquely identifies that shared closure; and moreover, shared closures are kept in shared memory until an application explicitly calls a "delete" operation (i.e., no garbage collection process is at work in shared memory at least for cached objects). As such, there is no need for any type of reference to a shared closure residing in shared memory.

If the other application associated with local memory cache_2 531 effectively modifies its local object 562c (e.g., with a "put" operation), the storage plug-in for local memory cache_2 531 will create a "second version" 563 of shared object 562b in shared memory cache 532 that incorporates the modification made to local object 562c. According to an implementation, the storage plug-in 524 does not receive any affirmative indication of the existence of the new version but is instead configured to look for new versions in shared memory (e.g., upon a "put" or "get" operation) given the possibility of their existence under the shared flavor scheme. For instance, a "get" operation by application 501 will result in the reading of object 562a and object 563 by plug-in 524. Likewise, a "put" operation by application 501 can result in the fetching of object 563 by plug-in 524 so that it is possible to modify a local copy of the object 563 version. Here, note that storage plug-in 524 may also institute "spooling" and "write through" policies to deeper storage. In an embodiment, a separate plug-in in cache region 513 (not shown) is used to interface with the deeper storage and is called upon as needed by storage plug-in 524 to institute spooling and write through policies.

Figure 8:
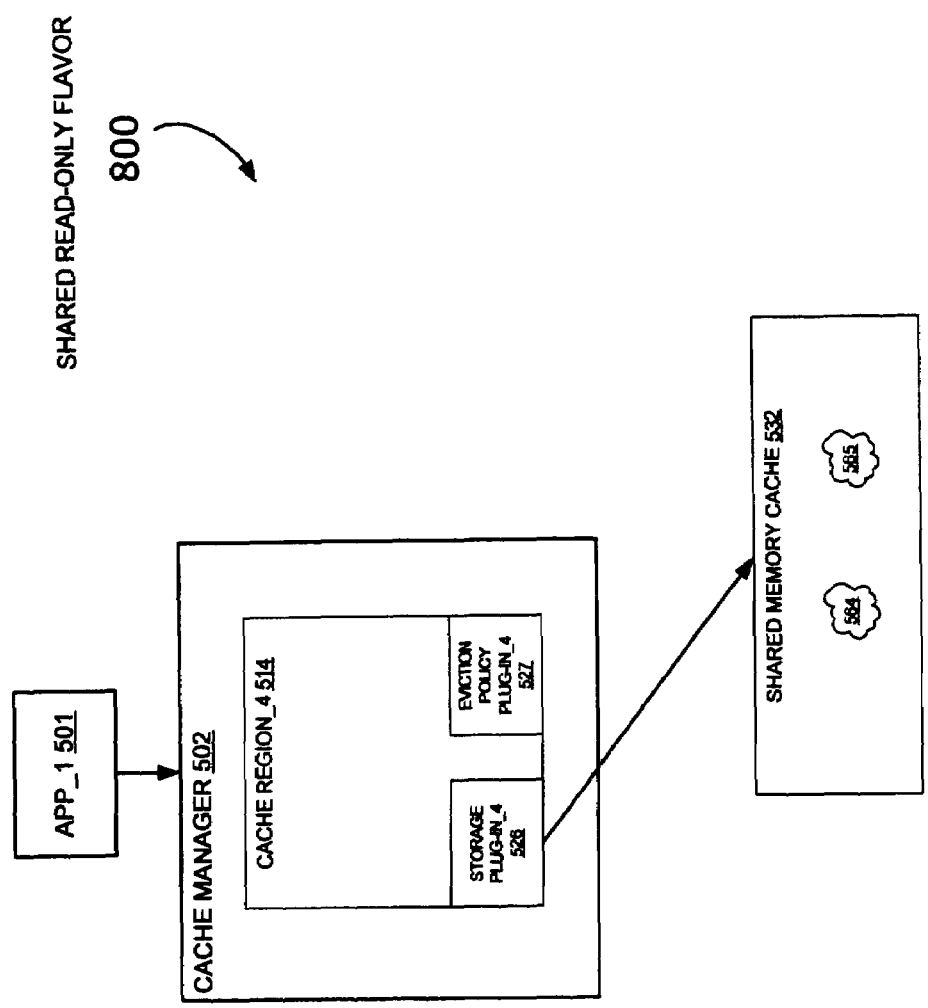
FIG. 8 illustrates an embodiment of a fourth cache region flavor.

FIG. 8 shows another shared memory based flavor that may be referred to as "Shared Read-Only." The essence of the Shared Read-Only approach is that local copies do not exist (i.e., only an object 564 in shared memory cache 532 exists); and, no modification is supposed to be made to the shared object under typical circumstances. The eviction policy plug-in 527 determines when the object 564 does not need to reside in shared memory cache 532 any longer.

In an extended embodiment, if a requirement to modify the object 564 arises, the storage plug-in 526 associated with the application 501 that desires to make the modification creates an entirely new object and places it into the shared memory 532 as a second version 565. Subsequently, when object 564 is requested from shared memory 532 by another application, the updated, second version 565 may also be retrieved. Here, note that storage plug-in 526 may also institute "spooling" and "write through" policies to deeper storage. In an embodiment, a separate plug-in in cache region 514 (not shown) is used to interface with the deeper storage and is called upon as needed by storage plug-in 526 to institute spooling and write through policies.

For either of the shared flavors discussed above, the storage plug-in may be configured to control the size of the shared closures that are being entered into shared memory cache 532. Specifically, smaller shared closures may be "bundled" with other shared closures to form effectively a data structure that contains multiple shared closures and that is effectively treated as a single shared closure for copying operations from shared memory cache 532 into local memory cache 530 (or vice versa). Here, a bundle may be created simply by ensuring that each shared closure in the bundle is associated through a reference to another shared closure in the bundle.

By increasing bundle size, overhead associated with copying objects back and forth between shared memory and local memory is reduced in certain circumstances, particularly, environments where many smaller shared closures are to be sent between shared memory and local memory at about the same time. Here, by bundling them, all shared closures can effectively be transported between shared memory and local memory by a single transfer process.

Storage Plug-In Programming Models

Figure 9:
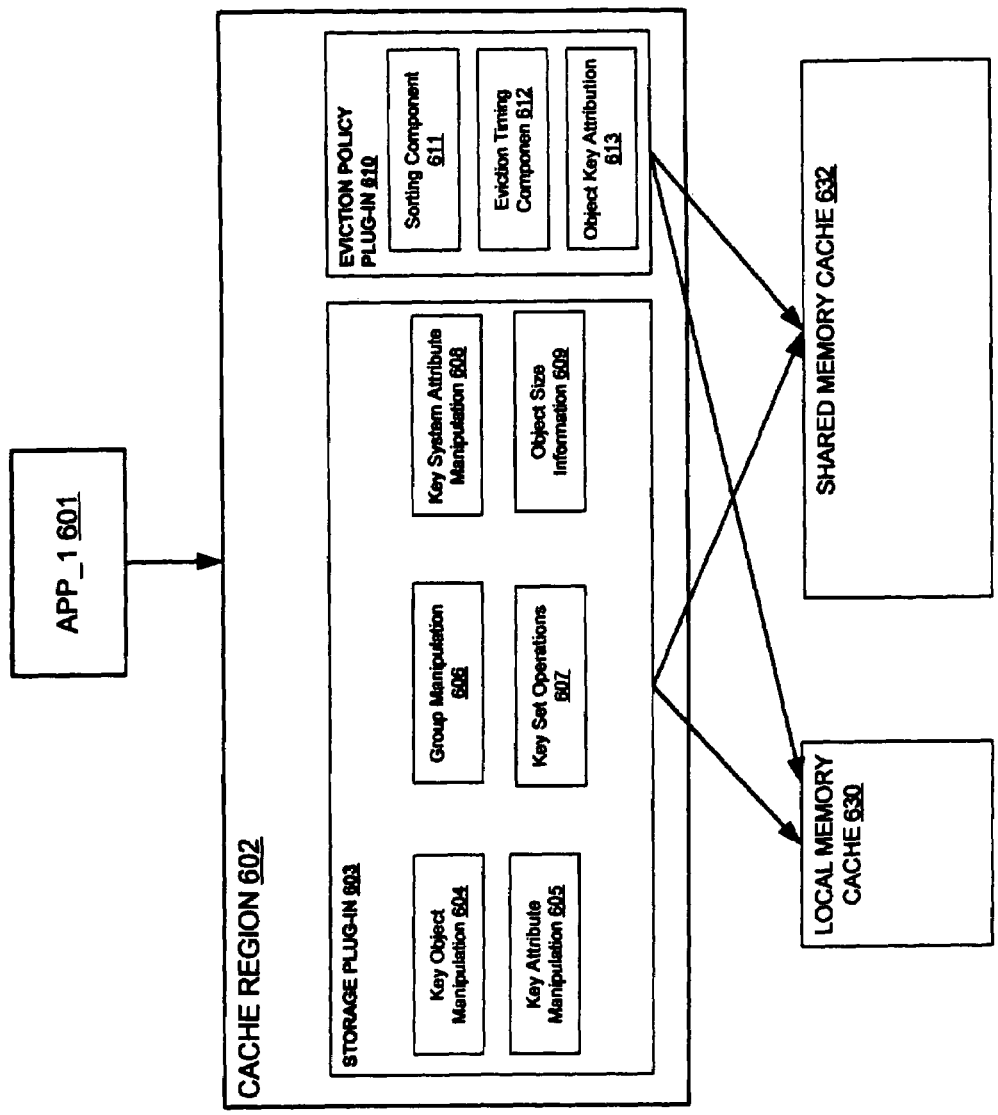

Until now, the storage plug-in for a particular cache region has been generally described as defining the cache storage treatment of one or more objects associated with the cache region. The storage plug-in may be, in one embodiment, the actual piece of software or code that executes various operations (e.g., "get" or "put") for objects stored according to the treatment determined by the associated cache region. FIG. 9 illustrates a more detailed perspective of a possible implementation for a single cache region 602. Recall that multiple cache regions may be established for a single application. Cache region 602 is shown having storage plug-in 603 and eviction policy plug-in 610.

Storage plug-in 603, in one embodiment, is logically represented as being capable of performing several functions, including Key Object Manipulation 604, Key Attribute Manipulation 605, Group Manipulation 606, Key Set Operations 607, Key System Attribute Manipulation 608, and Object Size Information 609. Several functionalities are also associated with eviction policy plug-in 610. These functionalities include Sorting 611, Eviction Timing 612, and Object Key Attribution 613. The various functionalities of eviction policy plug-in 610, which also define a treatment of objects in local memory cache 630 and shared memory cache 632, are described in greater detail further below with respect to FIGS. 13a,b-15. One, all, or a combination of these functionalities may be associated with each object that is handled according to the treatment defined by cache region 602. Again, exemplary discussing is provided in the context of a single object. But, it should be understood that at least with respect to the treatment of objects cached in shared memory, such objects may also be in the form of a shared closure.

Key Object Manipulation 604 is a storage plug-in function that relates to the "get" and "put" operations for an object. For example, a "get" operation retrieves a particular object from local cache memory 630 and/or shared memory cache 632 depending on the "flavor" of the plug-in (consistent with the different caching flavors described in the preceding section). A "put" operation places a copy of an object into local memory cache 630 and/or shared memory cache 632 (again, consistent with the specific "flavor" of the plug-in). For each object associated with a cache region, an object name may be assigned to each object. In turn, each object name may correspond to a unique key value. One embodiment of this organizational structure is illustrated in FIG. 10.

Figure 10:
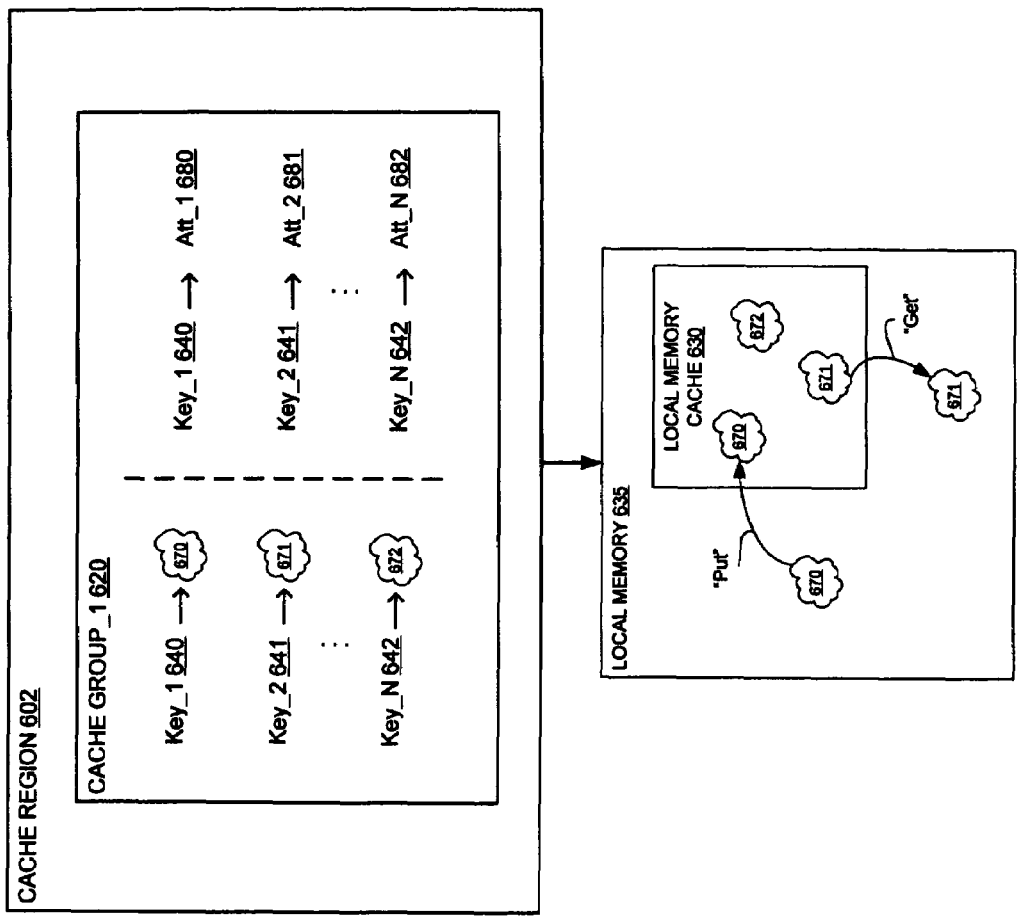
FIG. 10 illustrates one embodiment of an organization structure of a cache region.

Referring to FIG. 10, cache region 602 includes a cache group_1 620 associated with N objects 670, 671, . . . 672. It is important to point out that multiple groups of objects (or "object groups") may be established per cache region (i.e., FIG. 10 only shows one group but multiple such groups may exist in cache region 602). As will be described in more detail below, assignment of objects into a group allows for "massive" operations in which, through a single command from the application, an operation is performed with every object in the group.

Each object of cache group_1 620 is associated with a unique key. That is, for example, Key_1 640 is associated with object 670, key_2 641 is associated with object 671, and key_N is associated with object 672. Each key is a value (e.g., alphanumeric) that, for instance, in one embodiment, is the name of the object. In an embodiment, the key for an object undergoes a hashing function in order to identify the numerical address in cache memory where the object is located.

As such, the Key Object Manipulation functionality 604 of storage plug-in 603 utilizes the key associated with an object to carry out "put" and "get" operations on that object. For simplicity, only a local memory cache 635 is considered (e.g., the storage plug-in may be a "local" or "soft local" flavor).

As an example, object 670 may have the key "Adam" in simple text form. An application (e.g., application_1 601 of FIG. 9) provides the input for a "put" operation of object 670 which may take the form of [PUT, ADAM] in cache. The key, "Adam," undergoes a hashing function by storage plug-in 603 to generate the cache address where object 670 is to be stored. The key object manipulation "put" functionality of storage plug-in 603 completes the "put" operation by writing object 670 to local memory cache 630 at the address described provided by the hashing function.

A feature of the Key Object Manipulation 604 functionality is that an application does not need to know the exact location of a desired object. The application merely needs to reference an object by its key only and the Key Object Manipulation 604 functionality of the storage plug-in is able to actually put the object with that key into the local memory cache 630.

A "get" operation may be performed by the Key Object Manipulation 604 functionality in a similar manner. For example, object 671 may have the name "Bob." An application (e.g., application_1 601 of FIG. 9) provides the input for the "get" operation of object 671 which may take the form of, [GET BOB] from cache. The key, "Bob," undergoes a hashing function by storage plug-in 603 to determine the numerical address where object 671 is stored in local memory cache 630. The Key Object Manipulation 604 functionality of storage plug-in 603 completes the "get" operation by copying or removing object 671 to some other location in local memory 635 outside the cache.

Key Attribute Manipulation 605 is a functionality that relates to defining or changing particular attributes associated with an object. Here, each object has its own associated set of "attributes" that, in one embodiment, are stored in cache address locations other than that of the object itself. Attributes are characteristics of the object's character and are often used for imposing appropriate treatment upon the object. Examples of attributes include shareable/non-shareable and time-to-live (an amount of time an object is allowed to stay in a cache region before being evicted). As each cached object is associated with a key, an object's attributes may also be associated with the key.

Thus, as depicted in FIG. 10, Key_1 640, which is the key for object 670, is also associated with the collection of attributes_1 680 for object 670. Key_2 641, which is the key for object 671, is also associated with the collection of attributes_2 681 for object 671. Note that the attributes 680-682 are also stored in local memory cache 630 (but are not drawn in FIG. 10 for illustrative simplicity). As will be described in more detail below, in an embodiment, the key Attribute Manipulation function 605 performs a first hashing function on the key to locate the collection of attributes for the object in cache; and, performs a second hashing function on a specific type of attribute provided by the application to identify the specific object attribute that is to be manipulated (e.g., written to or read).

The Key System Attribute Manipulation 608 allows for system attributes (i.e., system level parameters) to be keyed and manipulated, and, operates similarly to the key attribute manipulation 605.

Group Manipulation 606 is a storage plug-in functionality that allows for "put" or "get" manipulation of all the objects within a particular group. By specifying the group name for a group of objects, the application may retrieve ("get") all the objects within that group. In an embodiment, the keys for a particular group are registered with the storage plug-in 603. As such, a group name that is supplied by the application is "effectively" converted into all the keys of the objects in the group by the storage plug-in 603. For example, application_1 601 may run a "get" operation for cache group_1 620. By using the name of cache group_1 620 as the input, each of keys key_1 640, key_2 641, . . . key_N 642 are used by the storage plug in cache of keys to perform a "get" operation.

Figure 11:
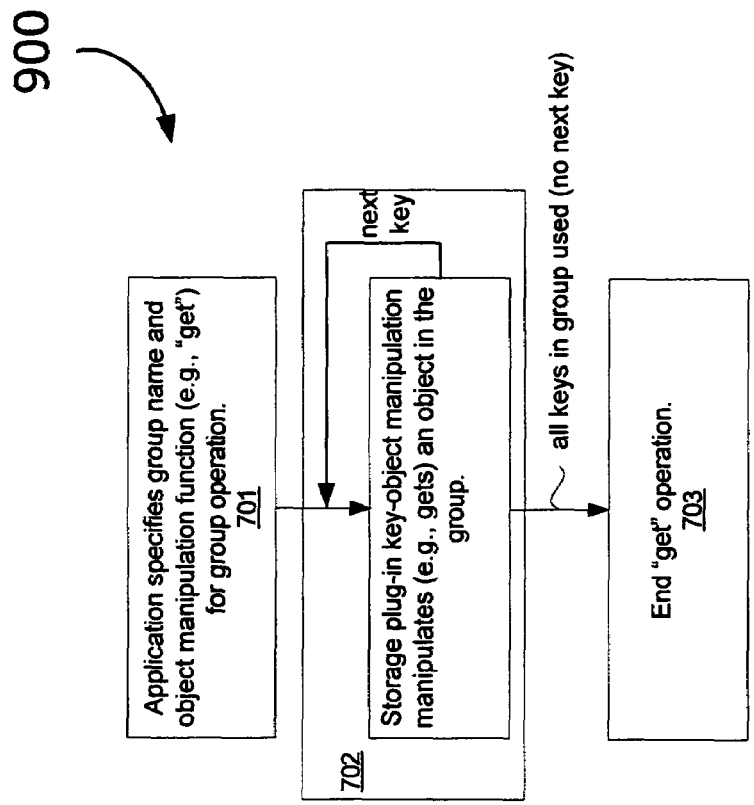
FIG. 11 illustrates a block diagram of one embodiment of a "get" operation using the Group Manipulation functionality.

FIG. 11 illustrates a block diagram 900 of one embodiment of a "get" operation using Group Manipulation 606 functionality and is described in association with FIG. 9 and FIG. 10. This functionality is particularly useful in scenarios involving "massive" operations in which all objects from a particular group are to be affected. Application_1 601 first specifies 701 the group name (e.g., the name of cache group_1 620) needed for the operation and the "get" operation itself. In response, the Group Manipulation 606 functionality of the storage plug-in 603 retrieves 702 all the objects in the group by using the key for the object the group. The "get" operation ends 703 when there are no more keys to use.

The Object Size Information function 609 causes the storage plug-in 603 to calculate the size of an object (e.g., in bytes). Here, the application supplies the key of the object whose size is to be calculated and specifies the object size information function 609. Combined with a Group Manipulation function, the Object Size Information function 609 enables storage plug-in 603 to calculate the size of an entire group. The Key Set Operations function 607 is used to perform specific operations with the keys themselves (e.g., return to the application all key values in a group specified by the application).

As discussed above, each object may have a collection of attributes (e.g., shareable/non-shareable, time-to-live, etc.). In one embodiment, these attributes may be organized in local memory cache to be accessed by an application in a manner similar to the retrieving of an object with a "get" operation described above with respect to the Key Object Manipulation 604 function. In one embodiment, a series of hashing operations may be performed to retrieve one or attributes of a particular object.

Figure 12:
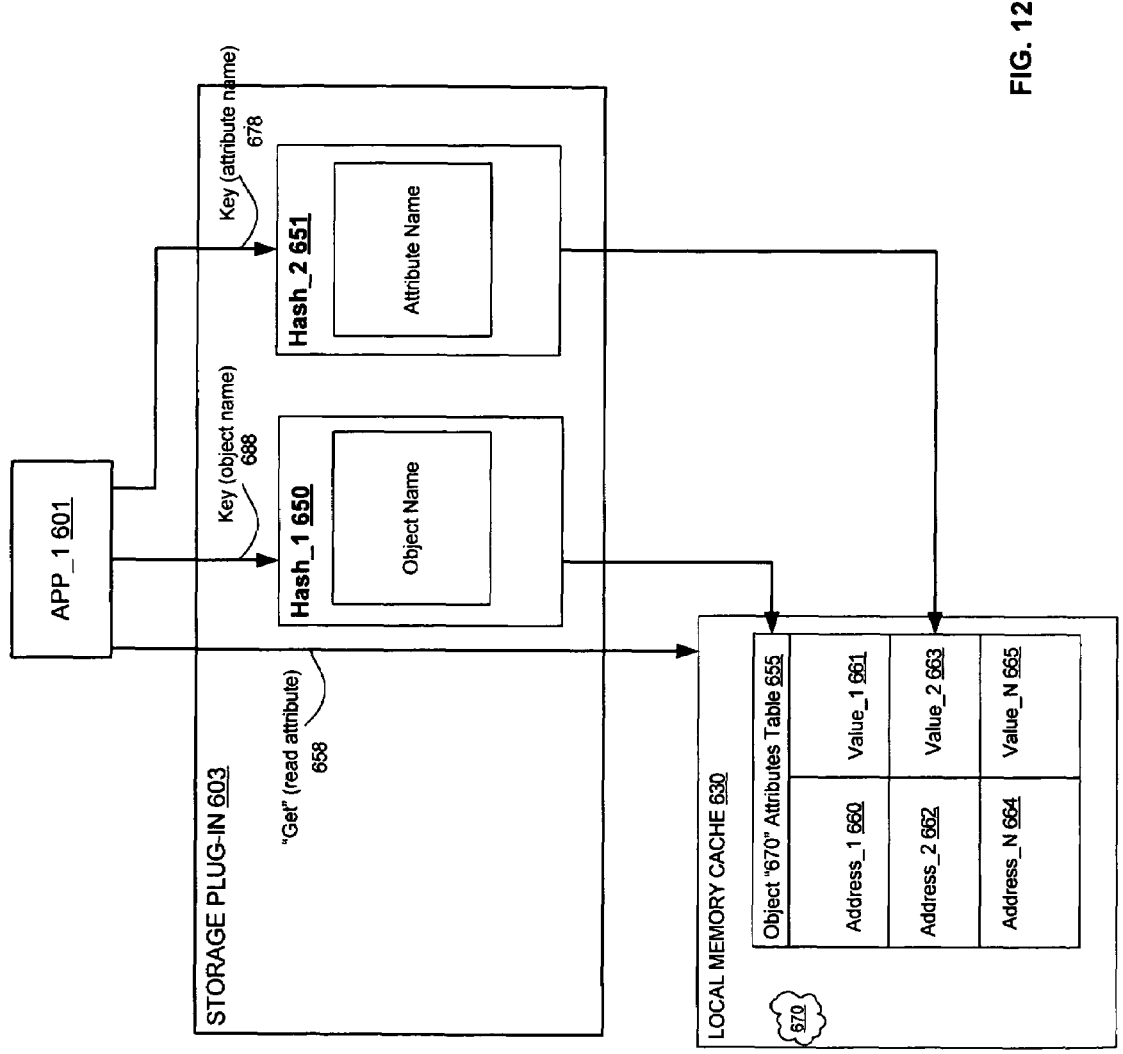
FIG. 12 illustrates a detailed perspective of retrieving an attribute associated with a particular object.

FIG. 12 illustrates a more detailed perspective of an approach for accessing an attribute associated with a particular object. As an extension of the example provided above for object 670 (the get operation for the "Adam" object), FIG. 12 illustrates an attributes table 655 for object 670 organized in local memory cache 630. In one embodiment, attributes table 655 may be within a region of local memory cache in which a specific address value (e.g., address_1 660, address_2 662, ... address_N 664) is associated with a specific attribute value (e.g., value_1 661, value_2, 663, ... value_N 665).

A "get" operation for a particular attribute of an object may be carried out in the following manner. Application_1 601 specifies: 1) the operation 658 (e.g., "get"); 2) the key for the object 668 (e.g., "ADAM"); and, 3) the applicable attribute 678 (e.g., "SHAREABLE/NON-SHAREABLE"). As discussed above with respect to FIG. 10, a collection of attributes (e.g., attributes table 655) may be associated with a particular object. In the approach of FIG. 12, the table 655 for a particular object 670 is made accessible with the object's key. For example, as illustrated in FIG. 12, the key 688 ("Adam") for object 670 undergoes a first hashing function (i.e., hash_1 650), that, in consideration of the operation pertaining to an attribute, causes the numerical address in local memory cache 630 where attributes table 655 is located to be identified.

A second hashing function (i.e., hash_2 651) is performed using the desired attribute 678 (e.g., SHAREABLE/NON-SHAREABLE) as the key. The hash_2 651 hashing function identifies the particular numerical address of the particular attribute of attributes table 655 that is to be accessed. For example, if the Shareable/Non-shareable attribute value corresponds to value_2 663, the alphanumeric "name" of the attribute (e.g., "Shareable/Non-shareable") would map to address_2 662 of attributes table 655.

Eviction Policy Programming Models

Caches, either local or shared, have limited storage capacities. As such, a cache may require a procedure to remove lesser used objects in order, for example, to add new objects to the cache. Similar to a storage plug-in being designed to impose certain storage treatment(s) on an object, the eviction policy plug-in provides various functionalities for the active removal of an object from cache. As briefly discussed above with respect to FIG. 9, and as again provided in FIG. 13A, eviction policy plug-in 610 is logically represented as being cable of performing several functions, including object sorting 611, eviction timing 612, and object key attribution 613.

Figure 13A:
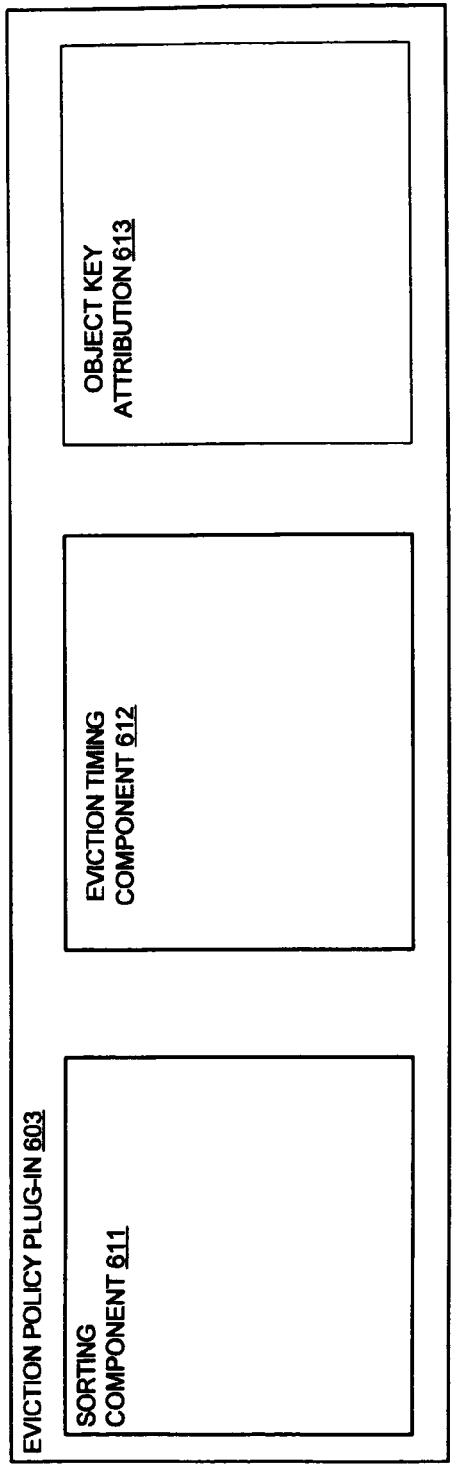

Referring to FIG. 13A, sorting component 611 is type of a queuing function that effectively sorts objects stored in a cache region so that a cached object that is most appropriate for eviction can be identified. Different sorting component types that each enforces a different sorting technique may be chosen from to instantiate a particular eviction policy with plug-in 606. That is, in one embodiment, there are different "flavors" of object sorting that may be selected from, and, one of these may be used to impose treatment on, for instance, an entire cache region. In other embodiments, multiple object sorting components (conceivably of different flavors) may be established per cache region (e.g., one mutation notification per cache group).

To the extent the sorting component 611 can be viewed as a component that chooses "what" object should be removed from cache, the eviction timing component 612 is a component that determines "when" an object should be removed from cache. Different flavors for eviction timing components may also exist and be chosen from for implementation. Typically, a single eviction timing component is instantiated per cache region; but, conceivably, multiple eviction policy components may be instantiated as well (e.g., one per cache group). The object key attribution 613 component enables the involvement of certain object attributes (e.g., object size) in eviction processes.

For simplicity, the remainder of this detailed description will be written as if an eviction policy plug-in applies to an entire cache region.

Figure 13B:
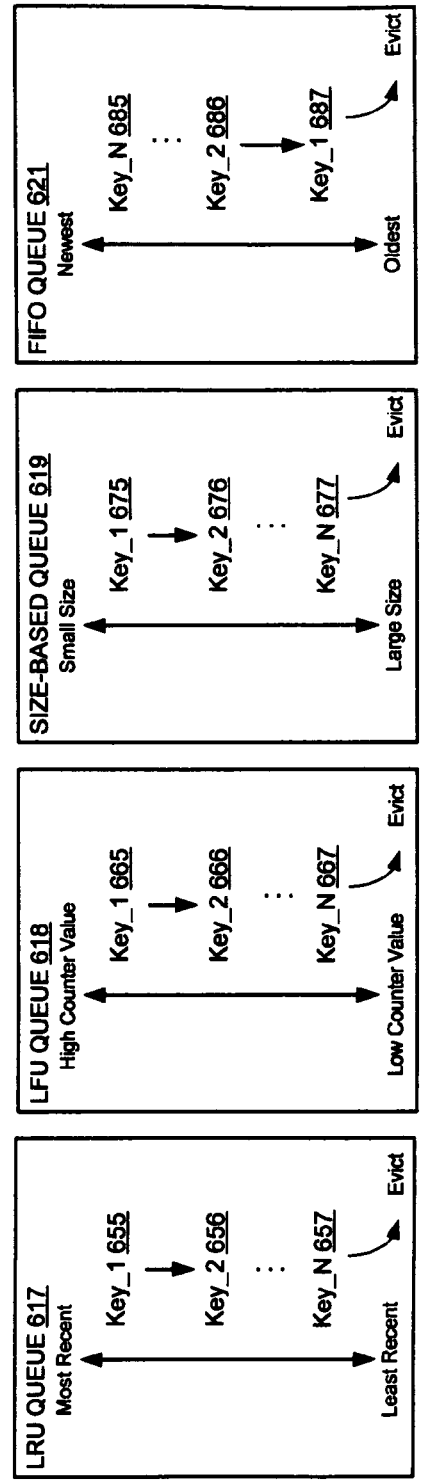

FIG. 13B illustrates a more detailed perspective of various types of sorting components 611 that may be chosen for use within a particular eviction policy plug-in 603. In one embodiment, four types of queues may be implemented by sorting component 611: 1) a Least Recently Used (LRU) queue 617; 2) a Least Frequently Used (LFU) queue 618; 3) a size-based queue 619; and, 4) a First In First Out (FIFO) queue 621. In one embodiment, the different types of sorting techniques queue the keys associated with the cache region's cached objects. The identification of a key that is eligible for eviction results in the key's corresponding object being identified for eviction. In the case of shared closures, various approaches are possible. According to a first approach, sorting is performed at the object level, that is, keys are effectively sorted where each key represents an object; and, if a particular object identified for eviction happens to be a member of a shared closure that is cached in shared memory cache, the entire shared closure is evicted from shared memory cache (e.g., with a "delete" operation). According to a second approach, if an object is a member of a shared closure, a key for the shared closure as a whole is sorted amongst other keys. In either case, identifying a "key" that is eligible for eviction results in the identifying of an object for eviction (where, in the case of shared closure, an object and all its shared closure member objects are identified for eviction).

According to the design of the LRU queue 617, objects cached in a cache region that are accessed least recently (e.g., through either a "get" or "put" operation) are discarded first. LRU queue 617 is represented with a vertical ordering structure for multiple keys (e.g., key_1 655, key_2 656, ... key_N 657). Essentially, the top of the queue represents keys for objects that have been used most recently, and, the bottom of the queue represents keys for objects that have been used least recently. According to one implementation of LRU queue 617, the object corresponding to the key at the very bottom would be next evicted. Removal of a key from the bottom of the queue triggers the eviction of that key's corresponding object from cache.

Here, any time an object is accessed (e.g., by way of a "get" or "put" operation), the key corresponding to that object is positioned at the very top of LRU queue 617. As illustrated by the position of key_1 655, the object associated with key_1 655 is the most recently accessed object. If, however, in a following operation an application (e.g., application_1 601) accesses the object associated with key_2 656, then, key_2 656 would be repositioned above key_1 655 in the LRU queue 617.

At any given instant of time, the key whose object has spent the longest amount of time in the cache region without being accessed will reside at the bottom of the queue. As such, when the moment arises to remove an object from the cache region, the object whose key resides at the bottom of the queue will be selected for removal from the cache region.

LFU queue 618 is an eviction policy in which cached objects accessed least frequently (e.g., through either a "get" or "put" operation), based on a counter, are discarded first. Each key for an object may have an associated counter that measures or keeps track of the number of times the object is accessed (e.g., the counter for the object's key is incremented each time the object is accessed). In one embodiment, the counter value may be an "attribute" for the object as described previously.

As with LRU queue 617, LFU queue 618 is represented with a vertical ordering structure for multiple keys (e.g., key_1 665, key_2 666 . . . , key_N 667). The top of the queue represents keys for objects that have the highest counter value, and the bottom of the queue represents keys for objects with the lowest counter value. Here, over the course of time, those keys whose corresponding objects are accessed more frequently than other cached objects will be "buoyant" and reside near the top of the queue; while, those keys whose corresponding objects are accessed less frequently than the other objects in the cache region will "sink" toward the bottom of the queue.

At any instant of time, the key whose corresponding object has been used less than any other object in the cache region will be at the bottom of the queue. Thus, according to one implementation of LFU queue 618, the object corresponding to the key at the very bottom would be next evicted, because that object has the lowest counter value (i.e., lowest frequency of use). Removal of the key from the bottom of the queue triggers the eviction of that key's corresponding object from the cache region. Note that the counters for all the keys may be reset periodically or with each entry of a newly cached object in order to ensure that all the counter values can be used as a comparative measurement of use.

Size-based queue 619 is an eviction policy in which cached objects are prioritized according to size (e.g., the number of total bytes for the object). As such, object size may be another object attribute. The keys for objects in size-based queue 619 are shown arranged vertically with the smallest objects positioned near the top of the queue and keys for the largest objects positioned near the bottom of the queue. According to one implementation of size-based queue 619, the object corresponding to the key at the very bottom would be evicted first, because that object consumes the most amount of cache region space, and its subsequent removal would result in the most amount of free cache region space recovered (amongst all the objects that are cached in the cache region).

FIFO queue 621 is an eviction policy in which cached objects are removed according to the order that they are placed in the cache relative to one another. In one embodiment, when an eviction moment arises, the first cached object eligible for eviction corresponds to the object that has spend the most time in the cache, followed by the next oldest object, and so on. FIFO queue 621, illustrated in FIG. 13b, is also depicted with a vertical ordering structure for key_1 655, key_2 656, . . . key_N 657, with key_1 655 corresponding to the oldest object (i.e., the first object placed in the cache) and key_N 677 corresponding to the newest object (i.e., the most recent object placed in the cache). When an eviction process is triggered, the object for key_1 675 would be the first for removal. Unlike the other types of queues described above (assuming the size of an object can change in respect of size-based queue 619), there is no possibility for any rearrangement of the key order in FIFO queue 621. The keys are maintained in the order they are added to the cache, regardless of frequency, counter value, or size.

Figure 14:
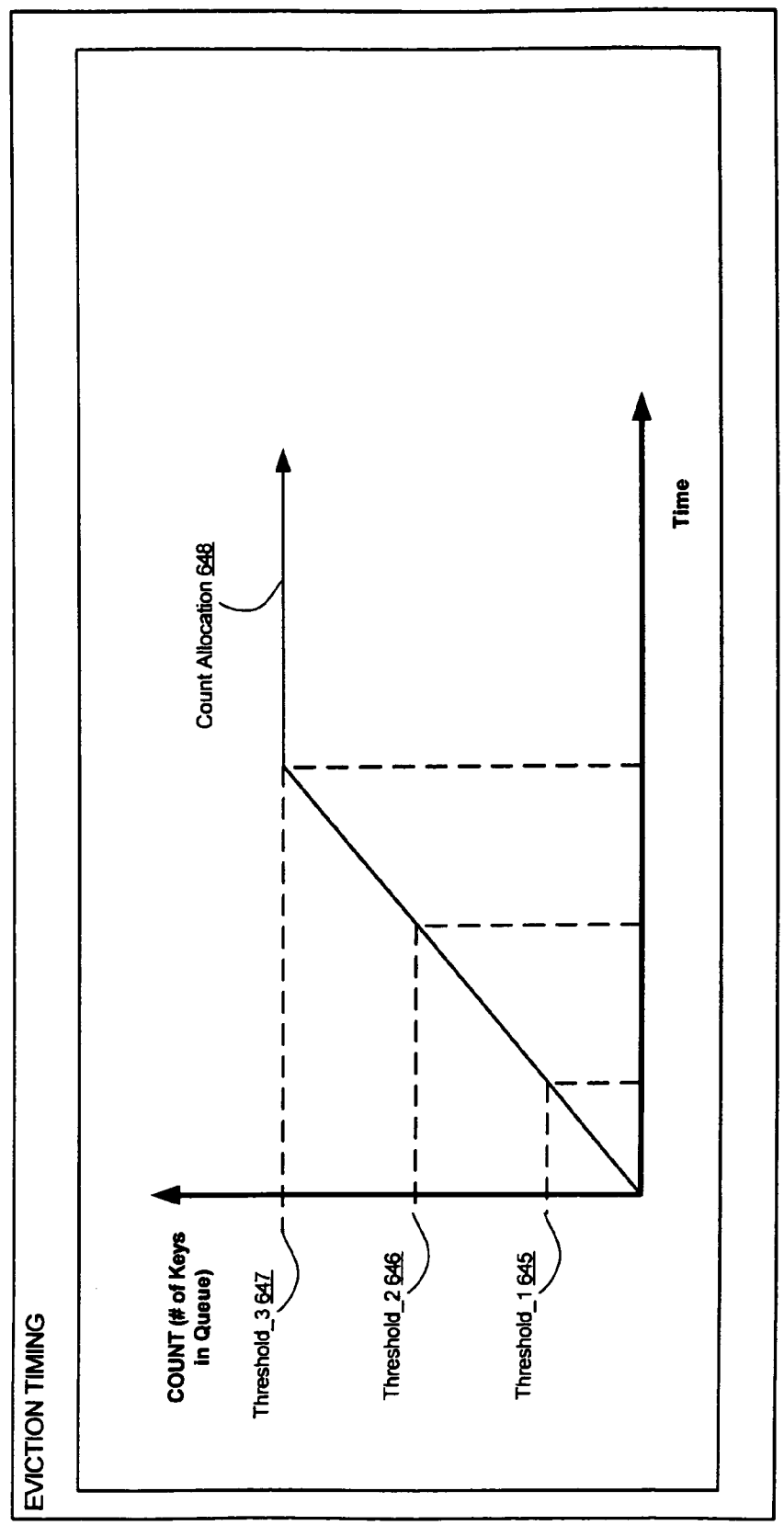
FIG. 14 illustrates a detailed graph of one type of Eviction timing component functionality.

Referring back to FIG. 13A, the eviction timing component 612 is a functionality that determines when an object should be removed from a cache region. FIG. 14 illustrates a detailed graph of one type of eviction timing approach. The vertical axis represents the total number of objects in the cache as represented by the total number of keys in the queue associated with the applicable object sorting approach. The horizontal axis represents time (e.g., in milliseconds). Count allocation 648 represents the "targeted" maximum number of keys in the queue, which, in turn, corresponds to the targeted maximum number of allowable objects in the cache region.

In one embodiment, three threshold levels may be established for the cache region. A first threshold level, threshold_1 645, corresponds to a level at which the eviction of a key from the sorting queue occurs on a timely basis. For example, when the count exceeds threshold_1 645 (but not threshold_2 646), a key is evicted from the sorting queue every millisecond until the total count falls below threshold_1 645. In one embodiment, no active eviction occurs for count levels below threshold_1 645.

A second threshold level, threshold_2 646, corresponds to a level above which eviction of a key occurs on each entry into the cache of a newly cached object. That is, with each new addition of an object into cache, the key at the bottom of the applicable sorting queue is removed from the queue resulting in its corresponding object's eviction from cache. With this approach, the population of the cache region should remain constant in the absence of objects being removed from the cache region by processes other than eviction (such as deletion and/or garbage collection and/or attribute based as described below with respect to Object Key Attribution). With processes other than eviction, the cache region population may fall below threshold_2 646 after the threshold has been crossed.

A third threshold level, threshold_3 647, corresponds to a level equal to the targeted maximum allocation 648 for the cache region. When this level is exceeded, keys are evicted from the sorting queue until, in one embodiment, the total count of keys decreases to threshold_3 647 (or just beneath threshold_3 647). Note that this approach contemplates the population of the cache region exceeding its "targeted" maximum allocation for some reason.

Figure 15:
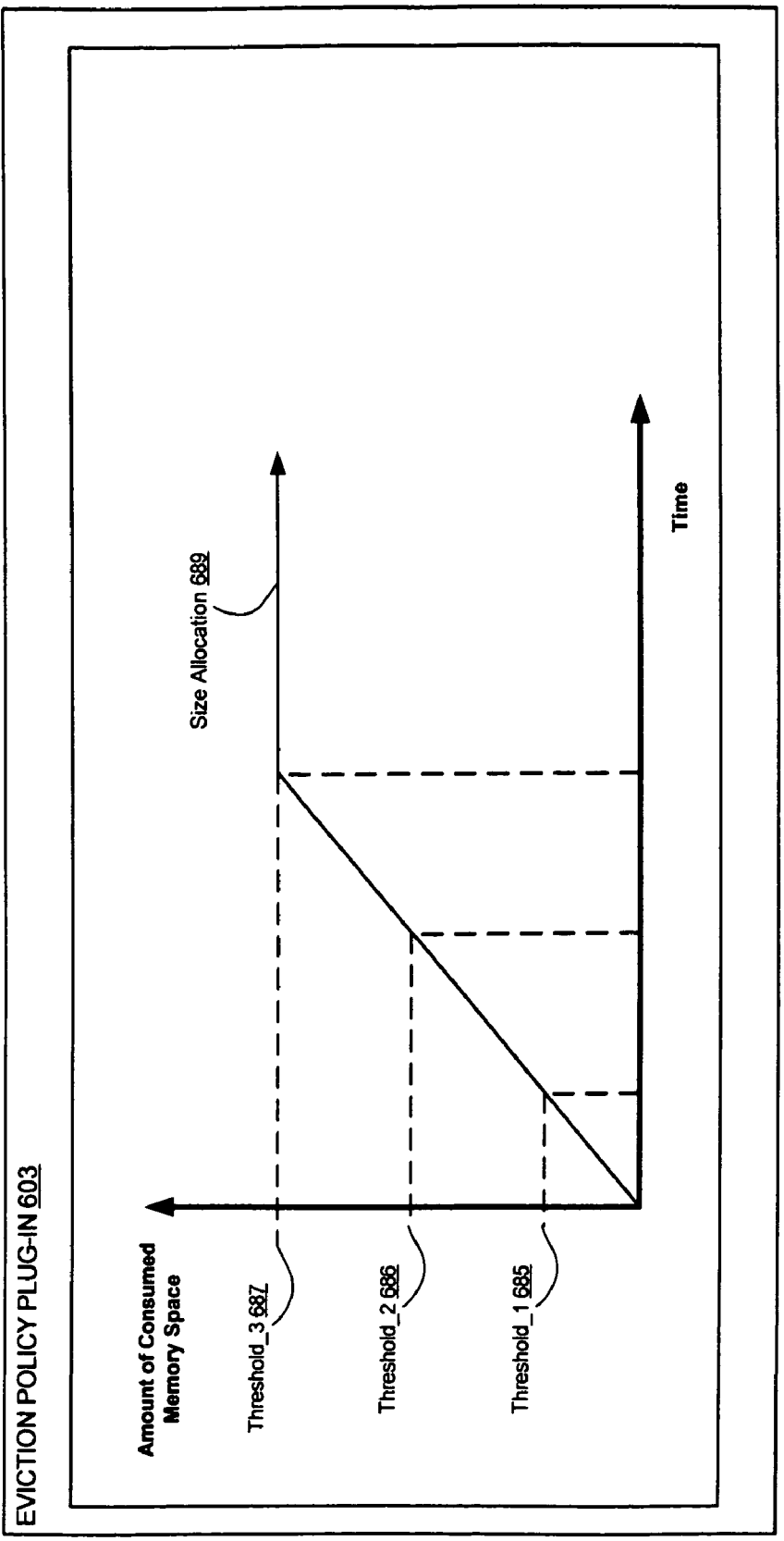
FIG. 15 illustrates a detailed graph of another type of Eviction timing component functionality.

Either of the eviction timing techniques may be used with the LRU 617 LFU 618 or FIFO 619 sorting technique. FIG. 15, by contrast, illustrates a detailed graph of another type of eviction timing technique that is to be used with the size based 619 sorting technique. In this embodiment, the vertical axis represents the total amount of consumed memory space of the cache. The horizontal axis represents time (e.g., in milliseconds). Size allocation 689 represents the maximum "targeted" allocated memory capacity of the cache region in terms of size (e.g., bytes).

In one embodiment, threshold_1 685, threshold_2 686, and threshold_3 687 have similar properties with threshold_1 645, threshold_2 646, and threshold_3 647, respectively. The only difference is that the memory consumption of the cache region (through the caching of its cached objects) triggers the crossing of the various thresholds.

Referring again back to FIG. 13A, Object Key Attribution 613 is a functionality that allows for the eviction of objects based on specific attributes that may be user-defined, system-defined, or otherwise customizable. For example, objects may be evicted on a Time-To-Live (TTL) basis in which case an object's key is pulled from the sorting queue (regardless of where it is located within the queue) if the object resides in the cache region for more than an amount of time set by the TTL attribute. Another attribute based eviction policy is Absolute Eviction Time (AET). In the case of AET, an actual time is set (e.g., 12:00 AM). If the object resides in the cache region after this time the object is evicted from the cache region.

Also, in the case of size based eviction policies, each objects size may be found in its attribute table.

Cache Management Library

Figure 16:
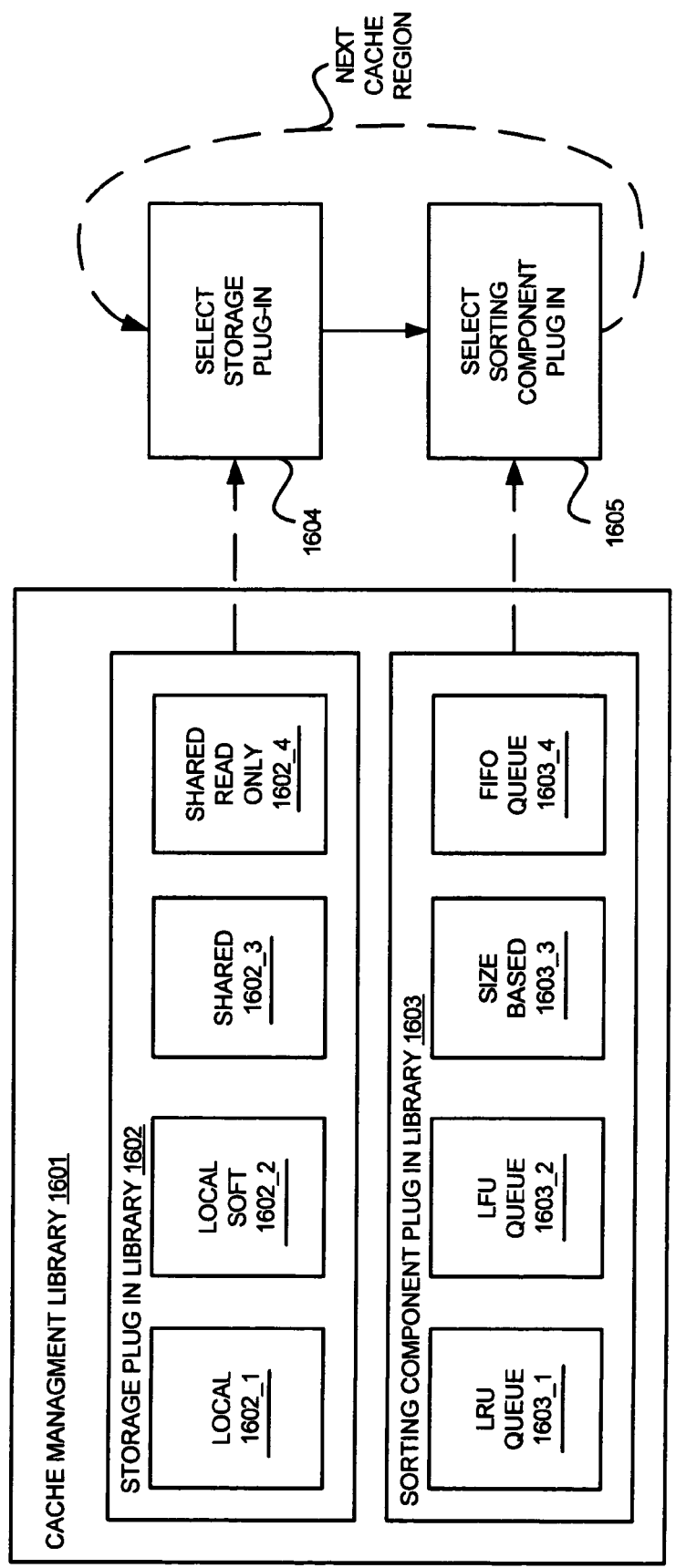
FIG. 16 shows a depiction of a cache region definition building process.

The preceding discussions revealed that, referring to FIG. 16, a cache management library 1601 containing various plug-ins may be used to help build cache regions that impose various forms of object/shared closure treatment. Specifically, the Local, Local Soft, Shared and Shared Read Only storage plug-ins 1602_1, 1602_2, 1602_3, 1602_4 may be part of a collective storage plug in library 1602; and, the LRU, LFU, Size Based and FIFO sorting plug-in components 1603_1, 1603_2, 1603_3, 1603_4 may be part of a collective sorting plug-in component library 1601.

Here, definition of a specific cache region is effected by selecting 1604 a storage plug-in from the storage plug-in part 1602 of the cache management library 1601 and by selecting 1605 a sorting component plug-in from the sorting component plug-in part 1603 of the cache management library 1601. For each new cache region to be implemented, another iteration of the selection processes 1604, 1605 is performed. Thus, if a single application were to establish multiple cache regions, the configuration for the application would entail running through selection processes 1604, 1605 for each cache region to be implemented.

Distributed Cache Architecture

As discussed above with respect to FIG. 4, a storage policy plug-in of a cache region may dictate that an object stored in the local and/or shared cache memory be copied into deeper storage space 440 (e.g., a persisted database, in response to an object's removal from the cache). In one embodiment, the storage of a particular object into deeper storage allows for the "sharing" of that object on a much larger scale (e.g., between different computing systems or application servers). For example, an object commonly used by a cluster of application servers may be written to a persisted database for retrieval by any physical machine.

In another example, a first computing system having a first virtual machine may crash during the course of running operations with a number of objects. If the objects are stored in a persisted database, a second virtual machine from a second computing system may be able to restore the operations that were running on the first computing system, using the same objects retrieved from the persisted database.

Figure 17:
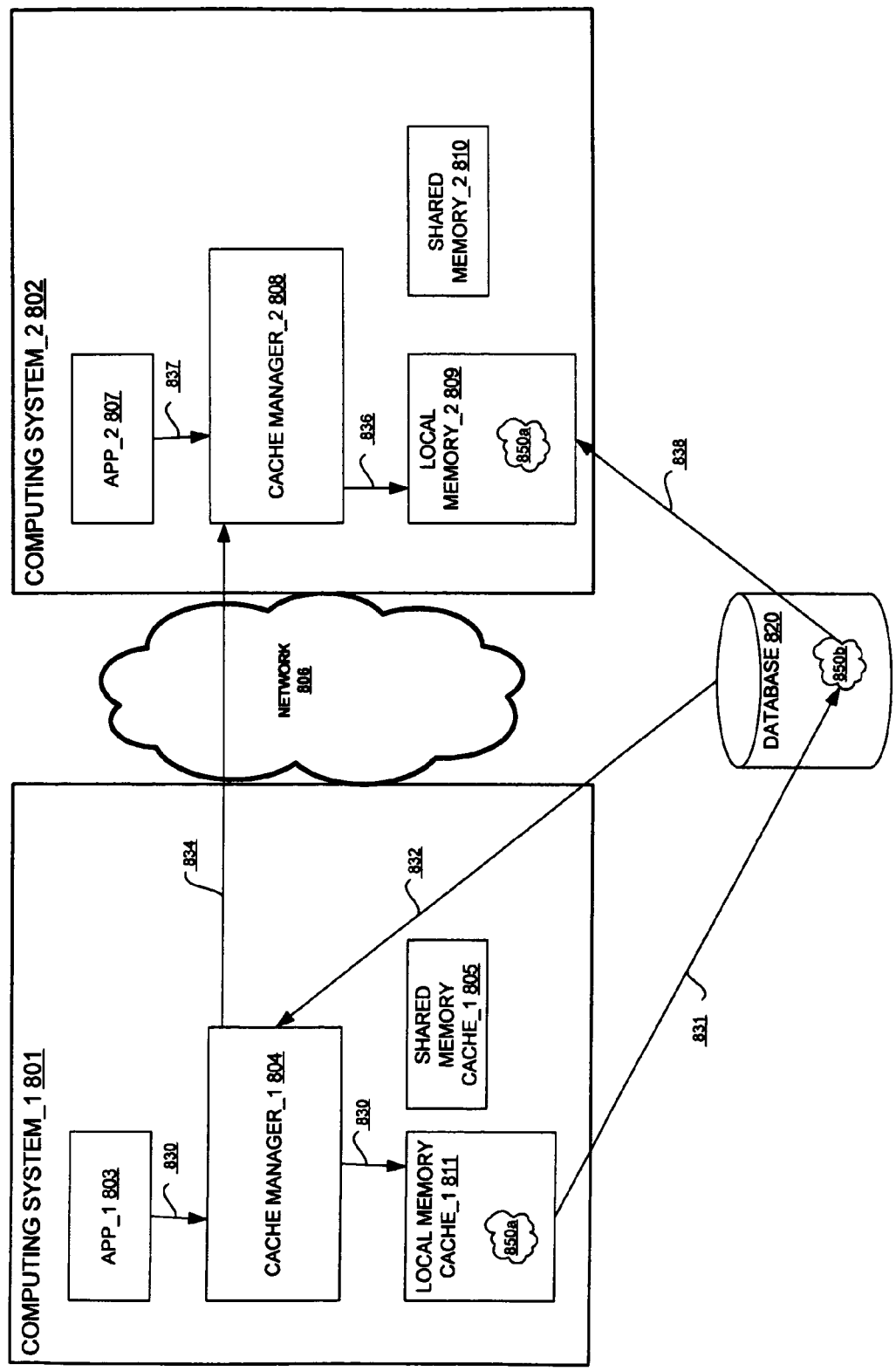
FIG. 17 illustrates a detailed perspective of one embodiment of a distributed cache architecture.
Figure 18:
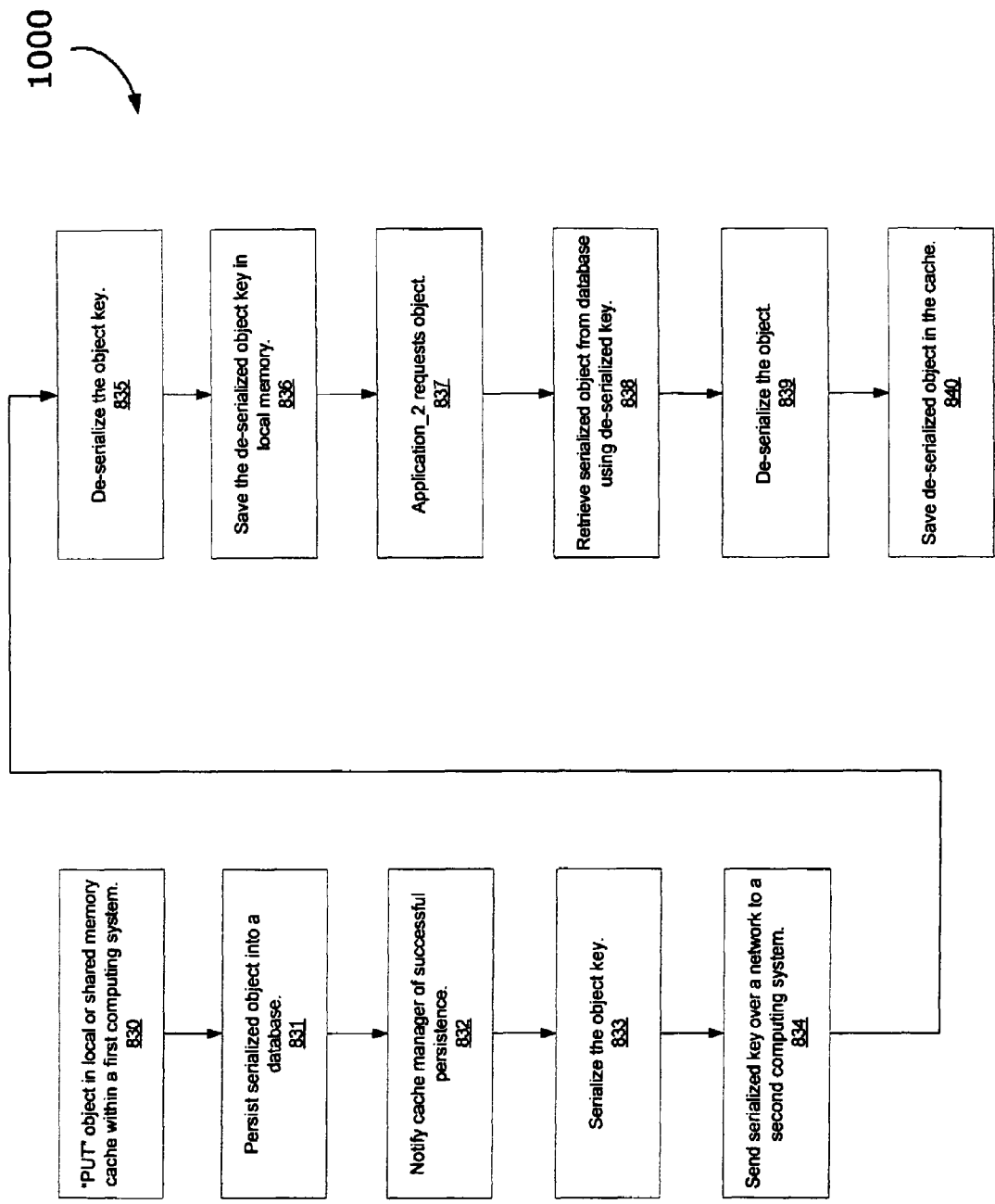
FIG. 18 illustrates a block diagram of one method of sharing an object between different computing systems.

FIG. 17 and block diagram 1000 of FIG. 18, taken together, illustrate one method of preserving an object's cached status between two computing systems. Application_1 803, running on computing system_1 801, specifies a "PUT" operation 830 for object 850a into local memory cache_1 811 or shared memory cache_1 805. In one embodiment, the "PUT" operation may involve the various functionalities of a storage plug-in described above for a cache region by cache manager_1 804. Object 850a is generically represented but in one embodiment object 850a may be a group of objects, and in another embodiment may be objects contained within a shared closure. Object 850a is then persisted 831 in database 820 that is visible to other computing systems, including computing system_2 802.

In one embodiment, a Structured Query Language (SQL), or SQL-like command statement may be used to write a serialized version of object 850b into database 820. (In FIG. 17, the de-serialized object is referenced as 850a, and the serialized object is referenced as 850b). In alternate embodiments, other known database languages may be used to write object 850b into database 820. Upon successful writing of object 850b in database 820, a notification "statement of success" is sent 832 to cache manager_1 804. Along with the success notification statement, the key for object 850b may also be sent to cache manager_1 804, where, according to a further implementation, the key is in a de-serialized form. Object keys have been discussed in detail above with respect to FIGS. 10-12.

Upon receiving the success notification and the de-serialized key for object 850b, cache manager_1 804 serializes 833 the key for object 850b and sends the serialized key 834 across a network 806 to computing system_2 802. Cache manager_2 808 receives the serialized key for object 850b and then de-serializes the key, 835. The de-serialized key may then be registered with a storage plug-in associated with cache manager_2 808.

When application_2 807 running on computing system_2 802 requests 837 object 850b, the de-serialized object key that is registered with cache manager_2 808 is used to retrieve 838 the serialized object 850b from database 820 at computing system_2 802. The serialized object 850b may then be de-serialized 839 by cache manager_2 808. The de-serialized object 850a may then be saved in local memory cache_2 809 and/or shared memory cache_2 810.

Closing Comments

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 19:
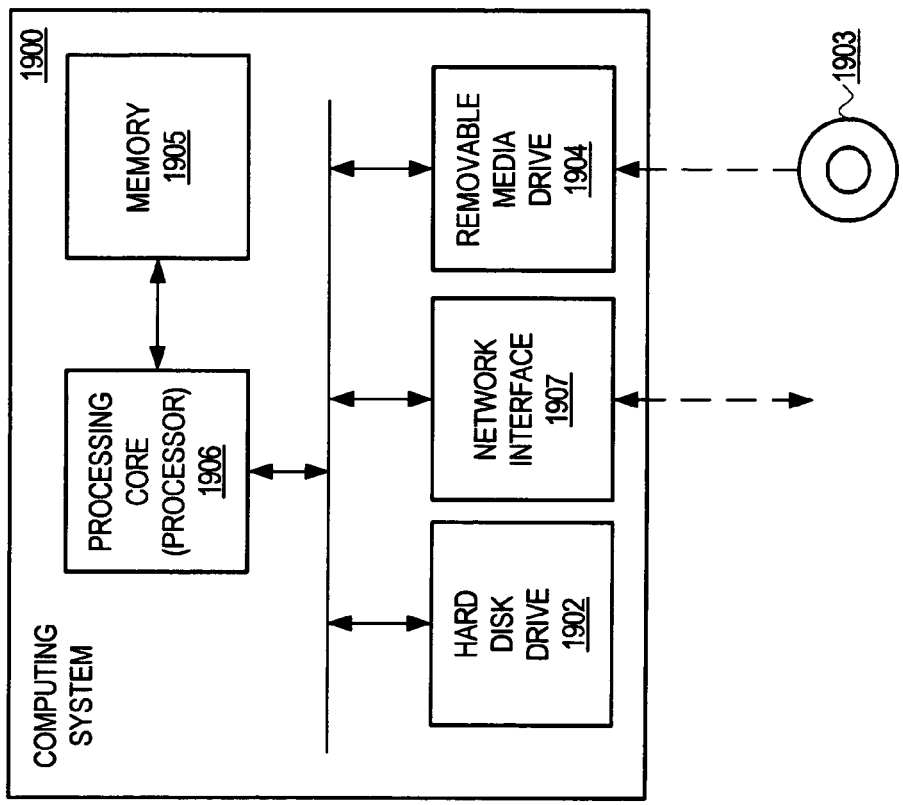
FIG. 19 illustrates an embodiment of a computing system.

FIG. 19 is a block diagram of a computing system 1900 that can execute program code stored by an article of manufacture. It is important to recognize that the computing system block diagram of FIG. 19 is just one of various computing system architectures. The applicable article of manufacture may include one or more fixed components (such as a hard disk drive 1902 or memory 1905) and/or various movable components such as a CD ROM 1903, a compact disc, a magnetic tape, etc operable with removable media drive 1904. In order to execute the program code, typically instructions of the program code are loaded into the Random Access Memory (RAM) 1905; and, the processing core 1906 then executes the instructions. The processing core 1906 may include one or more processors and a memory controller function. A virtual machine or "interpreter" (e.g., a Java Virtual Machine) may run on top of the processing core 1806 (architecturally speaking) in order to convert abstract code (e.g., Java byte code) into instructions that are understandable to the specific processor(s) of the processing core 1906.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
    configuring management of a region of a cache with an eviction policy plug-in, said eviction policy plug-in comprising an eviction timing component and a sorting component, said eviction timing component comprising program code to implement an eviction timing method, said eviction timing method to trigger eviction of an object from said region of cache, said sorting component comprising program code to implement a sorting method, said sorting method to identify an object that is eligible for eviction from said region of cache;
    managing said region of cache by executing said eviction timing method and said sorting method from said plug-in, said executing of said eviction timing method including triggering said sorting method because said region of cache's usage surpasses a threshold and referring to per-object customized attributes of objects cached in said region of cache to identify any per-object customized eviction timing policies amongst said objects, said threshold less than said region's full storage capacity, said executing of said eviction sorting method including identifying an object for eviction that is cached in said region of cache and that has been used less frequently than other objects that are cached in said region of cache, wherein said object is a member of a shared closure having a plurality of objects and cached in a shared memory in a computing system, said shared closure being shareable to a plurality of virtual machines.

2. The method of claim 1 wherein said eviction timing method further comprises, after said threshold is surpassed, triggering eviction of an object from said region of cache on a periodic basis.

3. The method of claim 1 wherein said eviction timing method further comprises, after said threshold is surpassed, triggering eviction of an object from said region of cache in response to a second object being newly entered into said region of cache.

4. The method of claim 1 wherein said eviction timing method further comprises, after said threshold is reached, triggering eviction of one or more objects from said cache region until the usage of said region of cache drops below a specific level beneath said threshold.

5. The method of claim 1 wherein said eviction timing method further comprises:
    after said threshold is surpassed, triggering eviction of an object from said region of cache on a periodic basis;
    after a second threshold is surpassed, triggering eviction of an object from said region of cache in response to a second object being newly entered into said region of cache; and,
    after a third threshold is reached, triggering eviction of one or more objects from said cache region until the usage of said region of cache drops below a specific level, where, said third threshold corresponds to greater usage of said region of cache than said second threshold and said second threshold corresponds to greater usage of said region of cache than said threshold.

6. A computing system comprising a machine, said computing system also comprising executable or interpretable program code disposed on a computer readable storage medium, said program code capable of being executed or interpreted by said machine to perform a method, said method comprising:
    configuring management of a region of a cache with an eviction policy plug-in, said eviction policy plug-in comprising an eviction timing component and a sorting component, said eviction timing component comprising program code to implement an eviction timing method, said eviction timing method to trigger eviction of an object from said region of cache, said sorting component comprising program code to implement a sorting method, said sorting method to identify an object that is eligible for eviction from said region of cache;
    managing said region of cache by executing said eviction timing method and said sorting method from said plug-in, said executing of said eviction timing method including referring to an attribute table that lists per-object customized attributes of objects cached in said region of cache to identify any per-object customized eviction timing policies amongst said objects, said executing of said eviction sorting method including identifying an object for eviction that is cached in said region of cache and that has been used less frequently than other objects that are cached in said region of cache, wherein said object is a member of a shared closure of a plurality of objects and cached in a shared memory in a computing system, said shared memory's storage resources being shared between a plurality of virtual machines, each of said virtual machines restricted to concurrent execution of only a limited number of threads, each of said virtual machines dedicated to a specific processor, wherein, there are less processors for said virtual machines to run on than the number of said virtual machines within said computing system.

7. The computing system of claim 6, wherein said instructions further cause the machine to perform said method comprising, after a threshold is surpassed, triggering eviction of an object from said region of cache on a timed basis.

8. The computing system of claim 6, wherein said instructions further cause the machine to perform said method comprising, after said second threshold is surpassed, triggering eviction of an object from said region of cache in response to a second object being newly entered into said region of cache.

9. The computing system of claim 6, wherein said instructions further cause the machine to perform said method comprising, after a third threshold is reached, triggering eviction of one or more objects from said cache region until a usage of said region of cache drops below a specific level.

10. The computing system of claim 6 wherein said eviction timing method further comprises:
   after a threshold is surpassed, triggering eviction of an object from said region of cache on a timed basis;
   after a second threshold is surpassed, triggering eviction of an object from said region of cache in response to a second object being newly entered into said region of cache; and,
   after a third threshold is reached, triggering eviction of one or more objects from said cache region until the usage of said region of cache drops below a specific level, where, said third threshold corresponds to greater usage of said region of cache than said second threshold and said second threshold corresponds to greater usage of said region of cache than said first threshold.

11. An article of manufacture including executable or interpretable program code recorded on a computer storage medium which, when executed or interpreted by a machine, causes the machine to perform a method, the method comprising:
   configuring management of a region of a cache with an eviction policy plug-in, said eviction policy plug-in comprising an eviction timing component and a sorting component, said eviction timing component comprising program code to implement an eviction timing method, said eviction timing method to trigger eviction of an object from said region of cache, said sorting component comprising program code to implement a sorting method, said sorting method to identify an object that is eligible for eviction from said region of cache;
   managing said region of cache by executing said eviction timing method and said sorting method from said plug-in, said executing of said eviction timing method including referring to an attribute table that lists per-object customized attributes of objects cached in said region of cache to identify any per-object customized eviction timing policies amongst said objects, said executing of said eviction sorting method including identifying an object for eviction that is cached in said region of cache and that has been used less frequently than other objects that are cached in said region of cache, wherein said object is a member of a shared closure and cached in a shared memory in a computing system, said shared memory's storage resources being shared between a plurality of virtual machines, each of said virtual machines restricted to concurrent execution of only a limited number of threads, each of said virtual machines dedicated to a specific processor, wherein, there are less processors for said virtual machines to run on than the number of said virtual machines within said computing system.

12. The article of manufacture as in claim 11, wherein the program code further causes the machine to perform said method of, after a threshold is surpassed, triggering eviction of an object from said region of cache on a timed basis.

13. The article of manufacture as in claim 11, wherein the program code further causes the machine to perform said method of, after said second threshold is surpassed, triggering eviction of an object from said region of cache in response to a second object being newly entered into said region of cache.

14. The article of manufacture as in claim 11, wherein the program code further causes the machine to perform said method of, after a third threshold is reached, triggering eviction of one or more objects from said cache region until a usage of said region of cache drops below a specific level.

15. The article of manufacture as in claim 11, wherein said eviction timing method further comprises:
   after a threshold is surpassed, triggering eviction of an object from said region of cache on a timed basis;
   after a second threshold is surpassed, triggering eviction of an object from said region of cache in response to a second object being newly entered into said region of cache; and,
   after a third threshold is reached, triggering eviction of one or more objects from said cache region until the usage of said region of cache drops below a specific level, where, said third threshold corresponds to greater usage of said region of cache than said second threshold and said second threshold corresponds to greater usage of said region of cache than said first threshold.

* * * * *